United States Patent
Tsao et al.

(10) Patent No.: US 8,131,409 B2
(45) Date of Patent: Mar. 6, 2012

(54) GYROLESS TRANSFER ORBIT SUN ACQUISITION USING ONLY WING CURRENT MEASUREMENT FEEDBACK

(75) Inventors: Tung-Ching Tsao, Torrance, CA (US); Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 12/635,426

(22) Filed: Dec. 10, 2009

(65) Prior Publication Data

US 2011/0024571 A1 Feb. 3, 2011

Related U.S. Application Data

(60) Provisional application No. 61/230,564, filed on Jul. 31, 2009.

(51) Int. Cl.
*G05D 1/08* (2006.01)
*B64G 1/10* (2006.01)

(52) U.S. Cl. .......................................... 701/13; 244/164
(58) Field of Classification Search .................. None
See application file for complete search history.

(56) References Cited

U.S. PATENT DOCUMENTS

| | | | |
|---|---|---|---|
| 6,571,156 B1 * | 5/2003 | Wang et al. ...................... | 701/13 |
| 6,600,976 B1 * | 7/2003 | Goodzeit et al. ................. | 701/13 |
| 2006/0186274 A1 | 8/2006 | Wang et al. | |
| 2007/0023579 A1 * | 2/2007 | Wang et al. ................ | 244/158.6 |
| 2008/0087769 A1 * | 4/2008 | Johnson ......................... | 244/166 |
| 2008/0135686 A1 | 6/2008 | Wang | |
| 2009/0119060 A1 | 5/2009 | Simburger | |

OTHER PUBLICATIONS

Extended European Search Report dated Nov. 9, 2010 in European Patent Application No. 10171521.7-1254, Applicant: The Boeing Company, (6 pages).

\* cited by examiner

*Primary Examiner* — Michael J. Zanelli

(57) ABSTRACT

A system and method for gyroless transfer orbit sun acquisition using only wing current measurement feedback is disclosed. With this system and method, a spacecraft is able to maneuver itself to orient its solar panel to its maximum solar exposure spinning attitude. The disclosed system and method involve controlling a spacecraft maneuver using only the solar wing current feedback as the sole closed-loop feedback sensor for attitude control. A spin controller is used for controlling the spacecraft spin axis orientation and spin rate. The spin controller commands the spacecraft spin axis orientation to align with an inertial fixed-direction and to rotate at a specified spin rate by using a momentum vector. In addition, a method for estimating spacecraft body angular rate and spacecraft attitude is disclosed. This method uses a combination of solar array current and spacecraft momentum as the cost function with solar wing current feedback as the only closed-loop feedback sensor.

16 Claims, 18 Drawing Sheets

|  | Diagonal $I_{ii}$ | Off-diagonal $I_{ij}$ | k |
|---|---|---|---|
| Use Truth DCM, rate, & wheel momentum Wheel Momentum Changing | 0.04% | 0.1% | 1.8% |
| Use Truth DCM, rate, & wheel momentum Wheel Momentum Not Changing | 0.03% | 0.5% | 2% |
| Use Estimated DCM, rate, & wheel momentum Wheel Momentum Changing | 0.3% | 20% | 3% |
| Use Estimated DCM, rate, & wheel momentum Wheel Momentum Not Changing | 0.3% | 10% | 120% |

\* Large error caused by wheel speed not changing

FIG. 7

GYROLESS TRANSFER ORBIT SUN ACQUISITION USING ONLY WING CURRENT MEASUREMENT FEEDBACK

RELATED APPLICATION

This application claims the benefit of and priority to U.S. Provisional Application Ser. No. 61/230,564, filed Jul. 31, 2009, the contents of which are incorporated by reference herein in its entirety.

BACKGROUND

The present disclosure relates to gyroless transfer orbit sun acquisition. In particular, it relates to gyroless transfer orbit sun acquisition using only wing current measurement feedback.

SUMMARY

The present disclosure teaches to a system and method for controlling a spacecraft maneuver using only the wing current feedback as its sole closed-loop feedback sensor for attitude control. By employing this system and method, the spacecraft will be able to maneuver itself to orient its solar panel to its maximum solar exposure-spinning attitude.

In the space industry, geosynchronous satellite attitude control during transfer orbit is a critical event. It usually takes about two weeks to shape the mission orbit to its target circular geosynchronous orbit. During that time, the satellite has to go through a series of main engine burns at apogee and perigee to raise the orbit, while the satellite itself has to be spin-stabilized at a constant spin rate about its x or z-axis. The idea is to gain enough dynamic spinning stiffness during main engine burns in order to maintain its desired attitude. The normal control actuators for the satellite are reaction wheels and thrusters. The normal feedback sensors employed are gyros, sun sensors, and star trackers. To meet mission requirements, various combinations of these actuators and sensors ensure that the satellite spins at a constant rate, and maintains a fixed inertial attitude, to within a few degrees, throughout the entire transfer orbit mission.

However, due to limited resources or gyro failure, the spacecraft attitude control system can face drastic challenges in the area of system stability and fault autonomy. Various attitude control system (ACS) designs have been proposed in white papers to address satellite attitude control without the use of a gyro. The present disclosure teaches a novel wing current feedback based control system to drive the spacecraft sun acquisition maneuvers without using any traditional feedback sensor such as a gyro, sun/earth sensor, or star tracker.

The critical life-saving maneuver when a satellite attitude is lost in space, Sun Acquisition, is used to demonstrate this novel approach. The algorithm itself only relies on wing current measurement feedback and ephemeris knowledge for sun unit vector in earth center inertial coordinate frame (ECI) to place the satellite solar panels at their maximum power-receiving attitude. The rate and quaternion are estimated via a wing current based optimization algorithm. The present disclosure teaches how to derive the optimal rate and attitude estimates based on wing current. In addition, a control law suitable for spin control is disclosed that is to be used with the estimator.

BRIEF DESCRIPTION OF THE DRAWINGS

The above-mentioned features and advantages of the present disclosure will become more apparent with reference to the following description taken in conjunction with the accompanying drawings wherein like reference numerals denote like elements and in which:

FIG. 7 shows a table containing percentage errors of diagonal and off-diagonal elements of the estimated inertia matrix using the Moment of Inertia (MOI) Estimator, in accordance with at least one embodiment of the present disclosure.

DETAILED DESCRIPTION

Figure 1:
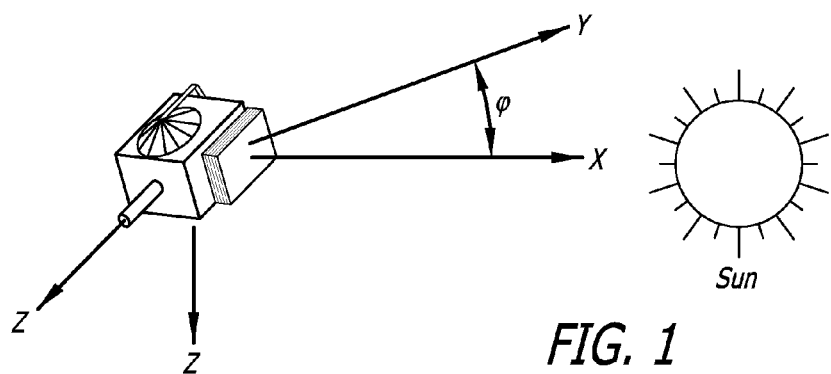
FIG. 1 shows a solar wing of a spacecraft receiving sun power to generate wing current for the spacecraft battery, in accordance with at least one embodiment of the present disclosure.
Figure 2:
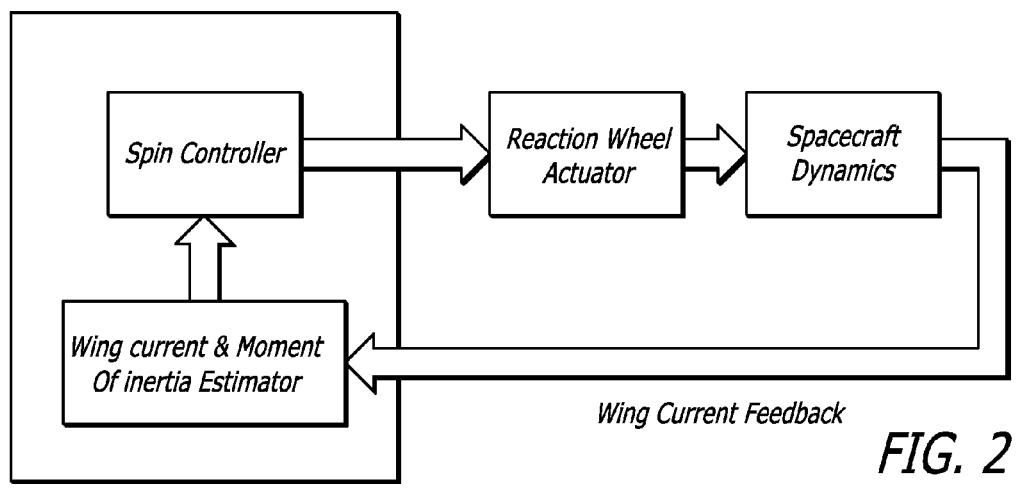
FIG. 2 depicts the process flow diagram for achieving sun acquisition using only wing current measurement feedback, in accordance with at least one embodiment of the present disclosure.

Nomenclature
$^b h$=vector resolved in coordinate frame b
$c_A^B$=directional cosine matrix from coordinate frame A to coordinate frame B
$\omega_A^B$=angular rate vector of coordinate frame B relative to coordinate frame A
ECI or eci=Earth Center Inertial coordinate frame
Spin Controller A controller to control spacecraft spin axis orientation and spin rate is used for the disclosed system. The controller can be used to 1) command a spacecraft to spin along its major or minor axis by changing the sign of the controller gain, and 2) command the spin axis orientation to line up with an inertial-fixed direction and rotate at a specified spin rate by using a momentum offset vector. The controller, together with the Moment of Inertia (MOI) Estimator, and the Wing Current Based Rate and Quaternion Estimator can be used drive the spacecraft to achieve a sun acquisition maneuver using only wing current feedback without the need of any other sensors. In one or more embodiments, FIG. 1 illustrates a solar wing of a spacecraft receiving sun power to generate wing current for the spacecraft battery. And, in some embodiments, FIG. 2 shows the process flow diagram for achieving sun acquisition using only wing current measurement feedback. This figure shows the Wing Current and MOI Estimator being used to control the Spin Controller.

The Spin Controller has the following structure, $$^b h_{ctrl} = k_{ctrl}(^b I\, ^b\omega_{eci} \times\, ^b\omega_{eci}\, ^b) + ^b h_{offset} \qquad (1)$$

The Spin Controller can be used to command the spacecraft to spin along any of the three principle axes, including the intermediate axis if a matrix value of gain kctrl is used. (See the Appendix.)

Figure 3:
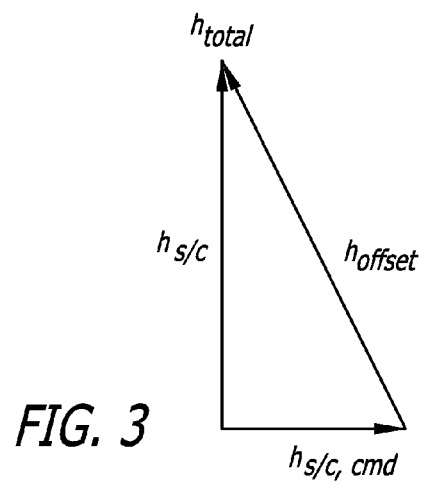
FIG. 3 illustrates the offset vector that the Spin Controller uses to shift the spacecraft spin axis to a commanded direction and magnitude, in accordance with at least one embodiment of the present disclosure.

The torque command applied to the spacecraft is $^b\tau_{ctrl} = -d\,^b h_{ctrl}/dt$, the reaction wheel momentum is $^b h_{whl} = -^b h_{ctrl}$, $k_{ctrl}$ is the scalar controller gain, $^b I$ is spacecraft inertia, $^b\omega_{eci}^b$ is the angular rate vector from ECI coordinate frame to a spacecraft body fixed coordinate frame resolved in the spacecraft body fixed frame, and $^b h_{offset}$ is an offset vector to command the spacecraft spin axis to a desired orientation and magnitude. FIG. 3 shows the offset vector that the Spin Controller uses to shift the spacecraft spin axis to a commanded direction and magnitude. The control law equation, Equation (1), shows that when $^b h_{offset}=0$, the control torque is zero only when the angular rate vector ω is aligned with Iω, which means ω has to be aligned with one of the principal axes of the inertia matrix I, otherwise the controller will not stop producing momentum and torque commands.

Theorem 1. The Spin Controller has the following properties when $|k_{ctrl}| < k^*$, where $$k^* = \sqrt{\frac{I_1 I_3}{\omega^2(I_1 - I_2)(I_2 - I_3)}}.$$

1. If $k_{ctrl} < 0$ the major axis rotation is a stable equilibrium, the minor axis rotation and the intermediate axis rotation are unstable equilibriums.

2. If $k_{ctrl} > 0$ the minor axis rotation is a stable equilibrium, the major axis rotation and the intermediate axis rotation are unstable equilibriums.

Proof. For a rigid body with inertia I, angular rate ω, and external torque τ, the dynamics of the rigid body motion is described by Euler's equation:

$$\frac{d}{dt}(I\omega) + \omega \times (I\omega + h) = \tau \qquad (2)$$

Applying the controller law, Equation (1), to the rigid body dynamics described by Equation (2) gives $$\dot{\omega} = I^{-1}\{-\omega \times [I\omega + (-k_{ctrl}(\omega \times I\omega) + h_{offset})] + k_{ctrl}\omega \times I\dot{\omega} + k_{ctrl}\dot{\omega} \times I\omega - h_{offset}\} \qquad (3)$$

When there is no offset, i.e., $h_{offset}=0$, the three principle axis rotations are the stationary solutions $\omega=0_{3\times 1}$ or the equilibriums of Eq. (3). To prove the stability properties of the equilibriums, assume for simplicity that $I=\text{diag}([J_1, J_2, J_3])$, where $J_1, J_2, J_3$ is a permutation of $I_1, I_2, I_3$. The stability of the rotation about first principle axis will be examined. Consider a tiny perturbation to the equilibrium $\omega=[\omega_1,0,0]^T$ occurs such that the angular rate vector becomes $[\omega_1+\epsilon,\omega_2,\omega_3]^T$ with magnitudes of $\epsilon, \omega_2, \omega_3$ arbitrarily small, and $\omega$ changes from a zero vector to $\dot{\omega}=[\dot{\omega}_1,\dot{\omega}_2,\dot{\omega}_3]^T$ at the same time with arbitrarily small magnitudes of $\dot{\omega}_1,\dot{\omega}_2,\dot{\omega}_3$. Equation (3) now becomes $$\begin{bmatrix} J_2 & k_{ctrl}\omega_1(J_3-J_1) \\ k_{ctrl}\omega_1(J_1-J_2) & J_3 \end{bmatrix}\begin{bmatrix} \dot{\omega}_2 \\ \dot{\omega}_3 \end{bmatrix} = \begin{bmatrix} k_{ctrl}\omega_1^2(J_1-J_2) & (J_3-J_1)\omega_1 \\ (J_1-J_2)\omega_1 & -k_{ctrl}\omega_1^2(J_3-J_1) \end{bmatrix}\begin{bmatrix} \omega_2 \\ \omega_3 \end{bmatrix} + h.o.t. \quad (4)$$

$$\equiv M\begin{bmatrix} \omega_2 \\ \omega_3 \end{bmatrix} + h.o.t. \Rightarrow \begin{bmatrix} \dot{\omega}_2 \\ \dot{\omega}_3 \end{bmatrix}$$

$$= \frac{PM}{d}\begin{bmatrix} \omega_2 \\ \omega_3 \end{bmatrix} + h.o.t.,$$

$$P = \begin{bmatrix} J_3 & -k_{ctrl}\omega_1(J_3-J_1) \\ -k_{ctrl}\omega_1(J_1-J_2) & J_2 \end{bmatrix},$$

$$d = J_2 J_3 + k_{ctrl}^2 \omega_1^2 (J_1-J_2)(J_1-J_3) \text{ where } h.o.t. = O(\|[\epsilon,\omega_2,\omega_3,\dot{\omega}]\|^2).$$

The characteristic equation of Equation (4) is $$\lambda^2 - [k_{ctrl}\omega_1^2 J_1(2J_1-J_2-J_3)/d]\lambda - \omega_1^2(J_1-J_2)(J_3-J_1)(1+k_{ctrl}^2\omega_1^2)/d = 0$$

which has roots $$\lambda = \frac{1}{2}(A \pm \sqrt{B}), \quad (5)$$

with $A = k_{ctrl}\omega_1^2 J_1(2J_1-J_2-J_3)/d$ and $B = A^2 + 4\omega_1^2(J_1-J_2)(J_3-J_1)(1+k_{ctrl}^2\omega_1^2)/d$ Since for major and minor axis rotations, d is always positive, from Equation (5), we have the following conclusions.

Case 1: $[\omega_1,0,0]$ is a major axis spin, i.e., $J_1>J_2>J_3$ or $J_1>J_3>J_2$ ($I_1=J_1, I_2=J_2, I_3=J_3$ or $I_1=J_1, I_2=J_3, I_3=J_2$)

$k_{ctrl}<0$ implies $A<0$ with $|B|<A^2$ or $B<0$, which means the major axis spin is a stable equilibrium.

$k_{ctrl}>0$ implies $A>0$ with $|B|<A^2$ or $B<0$, which means the major axis spin is an unstable equilibrium.

Case 2: $[\omega_1,0,0]$ is a minor axis spin, i.e., $J_3>J_2>J_1$ or $J_2>J_3>J_1$ $k_{ctrl}<0$ implies $A>0$ with $|B|<A^2$ or $B<0$, which means the minor axis spin is an unstable equilibrium.

$k_{ctrl}>0$ implies $A<0$ with $|B|<A^2$ or $B<0$, which means the minor axis spin is a stable equilibrium.

Case 3: $[\omega_1,0,0]$ is an intermediate axis spin, i.e., $J_3>J_1>J_2$ or $J_2>J_1>J_3$ Since $|k_{ctrl}|<k^*$ implies $d>0$ for intermediate axis, either $k_{ctrl}<0$ or $k_{ctrl}>0$ gives $|B|>A^2$, which means $\lambda$ has at least one positive root and hence the intermediate axis spin is an unstable equilibrium. Q.E.D.

Nonzero offset momentum $^bh_{offset}$ in Equation (1) can be used to shift the spacecraft spin axis to the direction pointed by the commanded vector $h_{s/c,cmd}=h_{total}-h_{offset}$ shown in FIG. 3, where $h_{total}$ is the spacecraft total angular momentum vector. The end value of the magnitude of spacecraft angular rate can be specified by $h_{s/c,cmd}$.

Figure 4A:
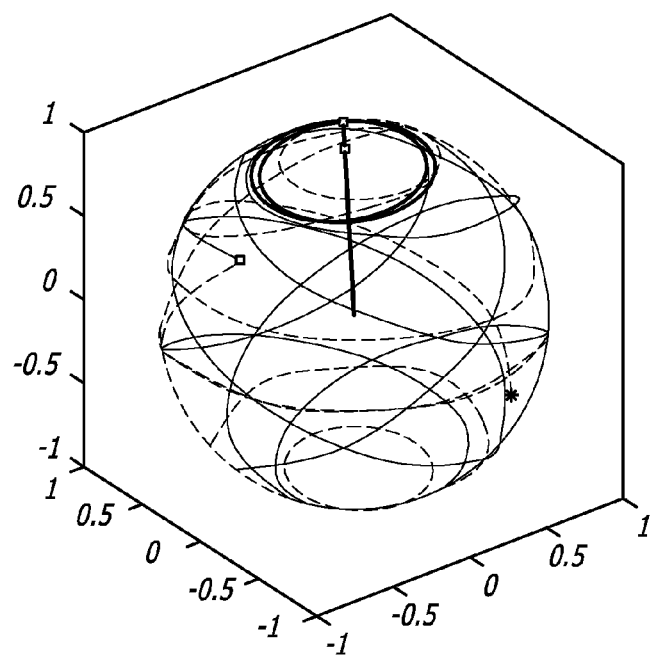
FIG. 4A shows wobble that occurs in uncontrolled Spin Controller performance, in accordance with at least one embodiment of the present disclosure.
Figure 4B:
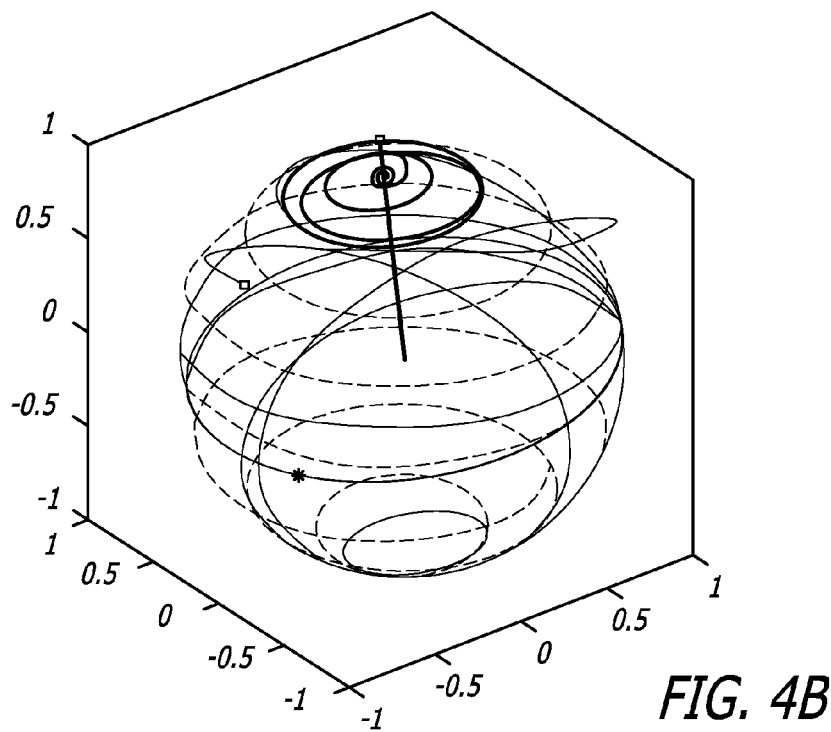
FIG. 4B shows the spin axis spiraling to a constant vector when the Spin Controller is applied, in accordance with at least one embodiment of the present disclosure.

The nonlinear Spin Controller described in Equation (1) allows the controlled dynamics to retain the $\omega \times I\omega$ characteristics of the uncontrolled rigid body dynamics. Simulation results show smooth responses of the closed-loop system controlled by the Spin Controller even when the actuator saturates and acts like a bang-bang controller. In one or more embodiments, FIGS. 4A and 4B show the performance of the Spin Controller. In particular, FIG. 4A shows wobble that occurs in uncontrolled Spin Controller performance, and FIG. 4B shows the spin axis spiraling to a constant vector when the Spin Controller is applied. Wobbling occurs when no control is applied, and the wobbling gradually disappears when the proposed controller is applied. In these figures, the trajectory starts at the square box icon and ends at the asterisk (*). In addition, in these figures, the bold trace is the unit vector of $\omega$ in ECI, the solid trace is the spacecraft body y-axis in ECI, and the dashed trace shows the last 200 seconds of the solid trace, which is used to show convergence.

Figure 5:
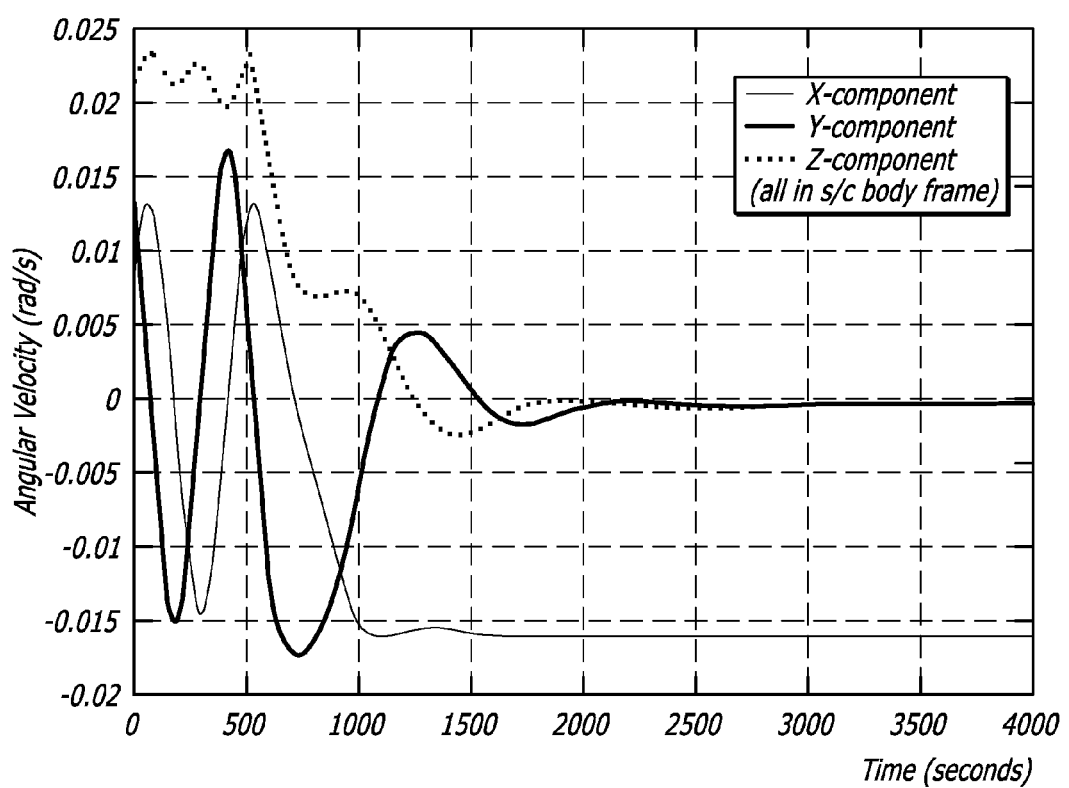
FIG. 5 shows the time history of the angular velocity as wobbling spirals to zero, in accordance with at least one embodiment of the present disclosure.

In some embodiments, FIG. 5 shows the time history of the spacecraft angular rate vector. The Spin Controller is applied at 500 seconds. It can be seen that the major axis (X-axis) spin is achieved in about 500 seconds after the application of the controller.

Figure 6:
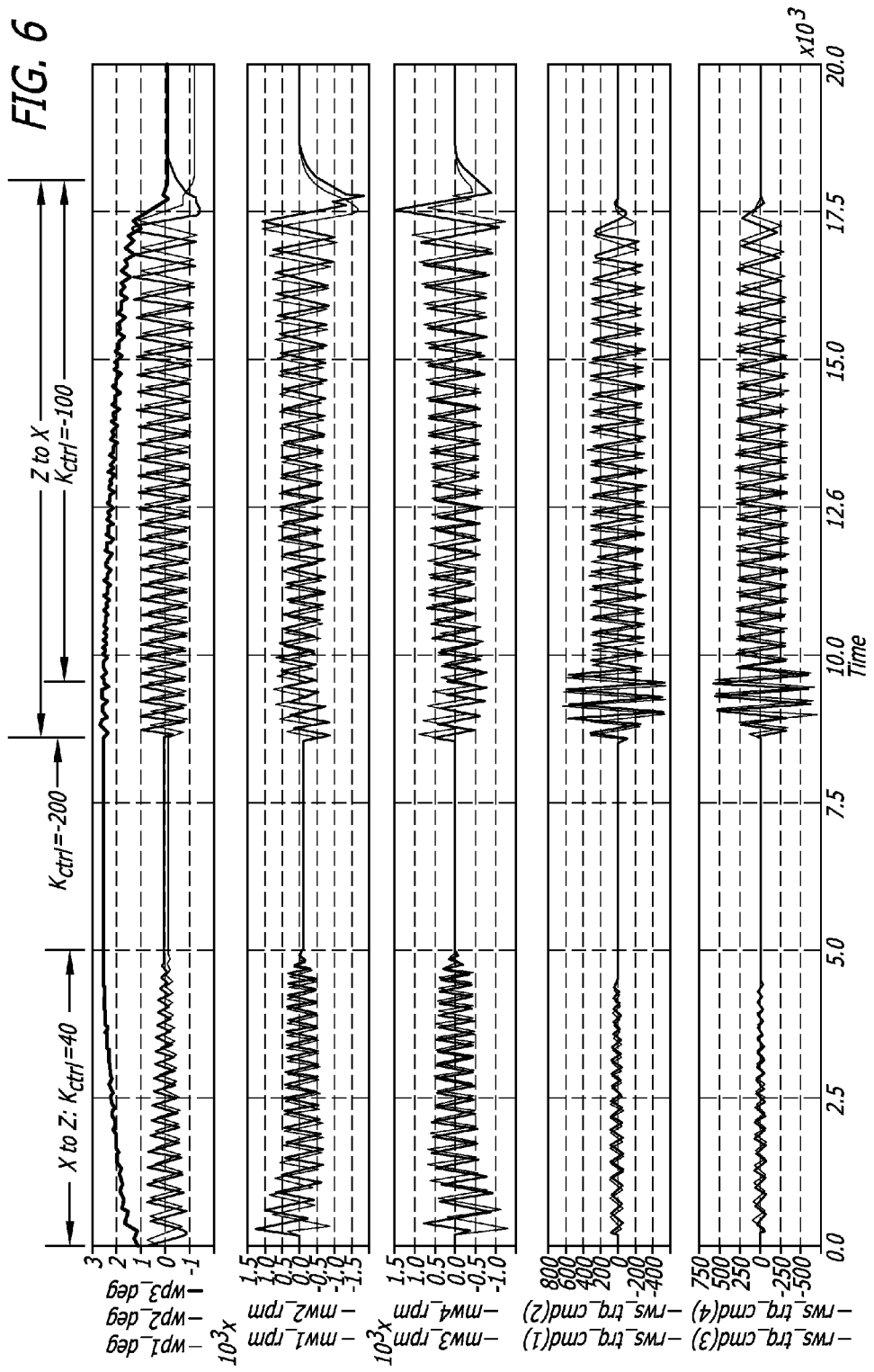
FIG. 6 shows spacecraft reorientation by using the Spin Controller, in accordance with at least one embodiment of the present disclosure.

The Spin Controller can be used to re-orient the spacecraft by simply changing the sign of its gain value. In one or more embodiments, FIG. 6 shows the X to Z and then, the Z to X reorientation maneuvers accomplished by the Spin Controller. At the beginning, a positive controller gain of 40 is used, and the spacecraft rotation changes from the major axis (X-axis) to the minor axis (Z-axis) spin in about 5,000 seconds. Then, the negative controller gains –200 and –100 are used, and the spacecraft rotation changes from the minor axis (Z-axis) to the major axis (X-axis) spin in 10,000 seconds. The commanded control torques become larger when a larger gain magnitude is used. In this figure, the top graph shows angular velocity (deg/s), the second graph from the top shows wheel speeds (rpm) of the first two momentum wheels, the third graph from the top shows wheel speeds (rpm) of the remaining two momentum wheels, the fourth graph from the top shows wheel torque commands to the first two momentum wheels, and the bottom graph shows wheel torque commands to the remaining two momentum wheels. Also in this figure, the faint trace is the x-component, the solid trace is the y-component, and the bold trace is the z-component.

Moment of Inertia (MOI) Estimator

The Spin Controller requires knowledge of the spacecraft inertia, which may vary in space. A Moment of Inertia (MOI) Estimator is disclosed that is to be used in the Spin Controller and the Wing Based Rate and Quaternion Estimator. The MOI estimator is derived based on the principle of conservation of angular momentum, which is $$kC_b^{eci}I\omega + kC_b^{eci}h_{whl} = k^{eci}H = \text{constant}, \forall \text{const}.k \quad (6)$$

where I is an inertia matrix, $\omega$ is angular rate vector, and $h_{whl}$ is the momentum of reaction wheels, and $^{eci}H$ is the total angular momentum of the spacecraft expressed in ECI frame. Define $\hat{I}=kI$ and $\hat{H}=k_{eci}H$, then Equation (6) is equivalent to $$\begin{bmatrix} \varphi_1^T & \psi_1^T & -1 & 0 & 0 \\ \varphi_2^T & \psi_2^T & 0 & -1 & 0 \\ \varphi_3^T & \psi_3^T & 0 & 0 & -1 \end{bmatrix} \begin{bmatrix} \theta \\ k \\ \hat{H}_1 \\ \hat{H}_2 \\ \hat{H}_3 \end{bmatrix} = \begin{bmatrix} -C_{11}\hat{I}_{11}\omega_1 \\ C_{21}\hat{I}_{11}\omega_1 \\ -C_{31}\hat{I}_{11}\omega_1 \end{bmatrix} \Leftrightarrow \tilde{\varphi}^T \tilde{\theta} = y,$$

$\hat{I}_{11}$ is an arbitrarily picked number where, $$\theta^T = [\hat{I}_{12}, \hat{I}_{13}, \hat{I}_{22}, \hat{I}_{23}, \hat{I}_{33}], \quad \tilde{\theta}^T = [\theta^T, k, \hat{H}_1, \hat{H}_2, \hat{H}_3]$$

$$\varphi_i^T = [C_{i1}\omega_2 + C_{i2}\omega_1, C_{i1}\omega_3 + C_{i3}\omega_1, C_{i2}\omega_2, C_{i2}\omega_3 + C_{i3}\omega_2, C_{i3}\omega_3],$$

$i = 1, 2, 3$ $\psi = C_b^{eci} h_{whl}$

Hence, the linear least square optimization methods can be used solve the MOI Estimator problem above. Note that, although $\hat{I}_{11}$ is an arbitrarily picked number, the original unscaled matrix I can be recovered once k in $\tilde{\theta}$ is solved. The following recursive least square solution is used to update the parameter vector $\tilde{\theta}$.

$\tilde{\theta}_{N+1} = A_{N+1}^{-1} b_{N+1}$, where $A_{N+1} = A_N + \Phi_{N+1} \Phi_{N+1}^T, b_{N+1} = b_N + \Phi_{N+1} y_{N+1}$, and $A_N = H_N^T H_N, b_N = H_N^T z_N, H_N^T = [\tilde{\phi}_1^T, \ldots, \tilde{\phi}_N^T], z_N = [y_1, \ldots, y_N]^T$ The MOI Estimator requires the knowledge of directional cosine matrix (DCM) $C_b^{eci}$ of the spacecraft attitude and the angular rate w information. In one or more embodiments, FIG. 7 shows a table containing percentage errors of diagonal and off-diagonal elements of the estimated inertia matrix using the Moment of Inertia (MOI) Estimator. As summarized in FIG. 7, better accuracy can be achieved when truth DCM and angular rates are used. Furthermore, variation of reaction wheel momentum provides excitation to the observed data; hence, it also results in better accuracy. The results shown were obtained by performing high fidelity nonlinear model simulations. The time histories of the simulated results are illustrated in FIGS. 8A, 8B, 8C, and 8D.

Figure 8A:
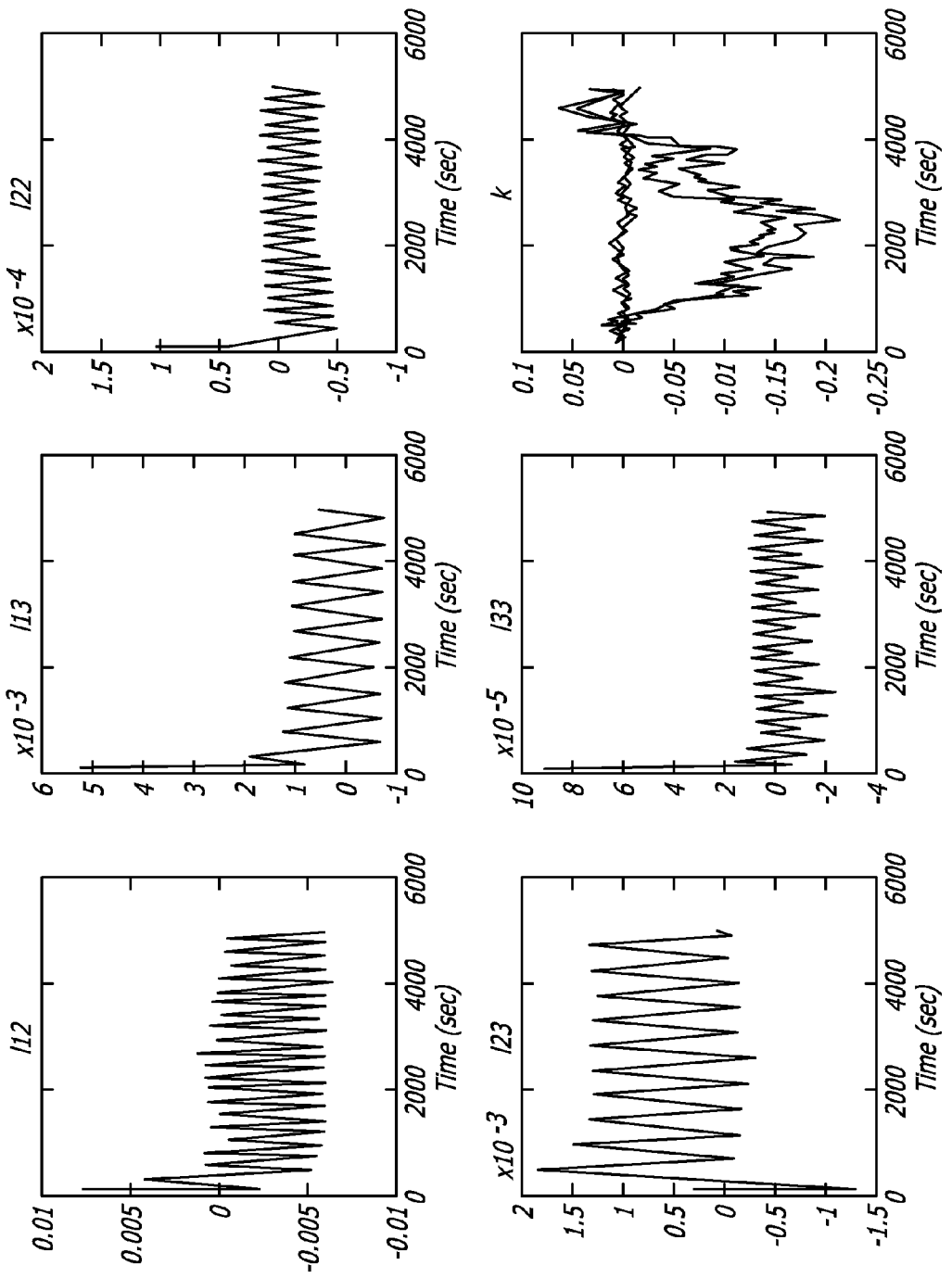
FIG. 8A shows time histories of the percentage errors of the estimated inertial matrix elements, where a truth directional cosine matrix (DCM) is used and the wheel momentum is not changing, in accordance with at least one embodiment of the present disclosure.
Figure 8B:
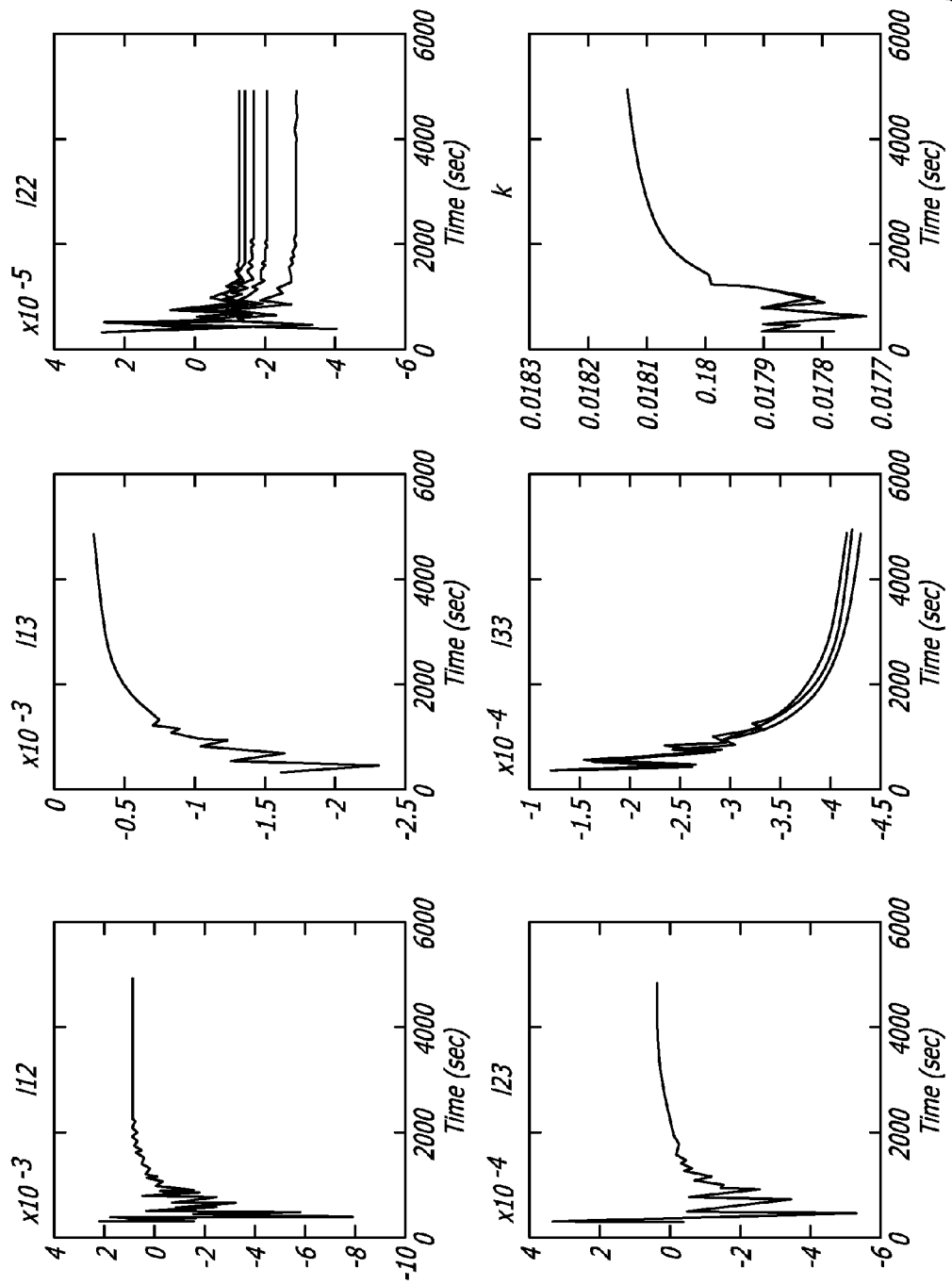
FIG. 8B shows time histories of the percentage errors of the estimated inertial matrix elements, where a truth DCM is used and the wheel momentum is changing, in accordance with at least one embodiment of the present disclosure.
Figure 8C:
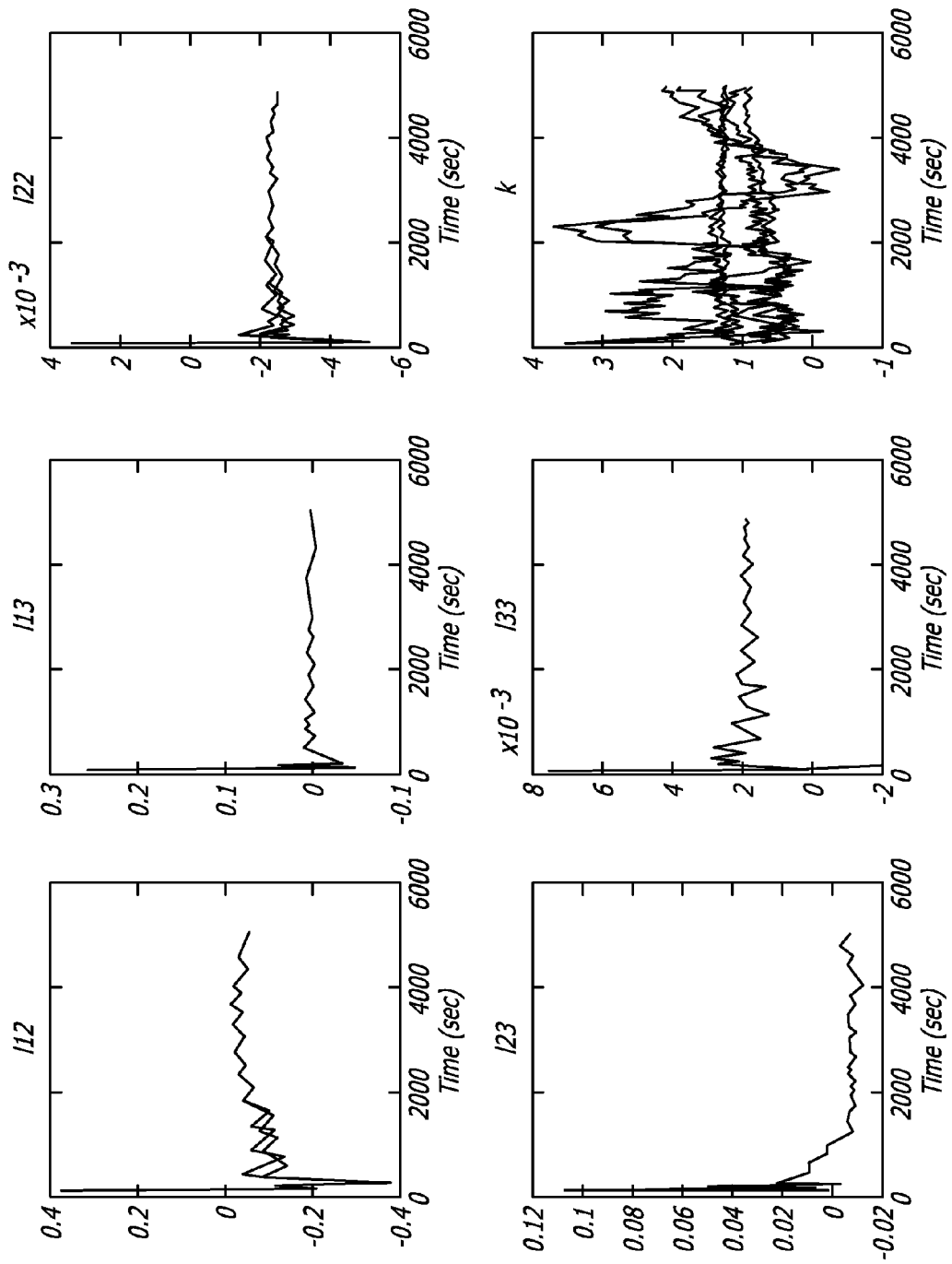
FIG. 8C shows time histories of the percentage errors of the estimated inertial matrix elements, where an estimated DCM is used and the wheel momentum is not changing, in accordance with at least one embodiment of the present disclosure.
Figure 8D:
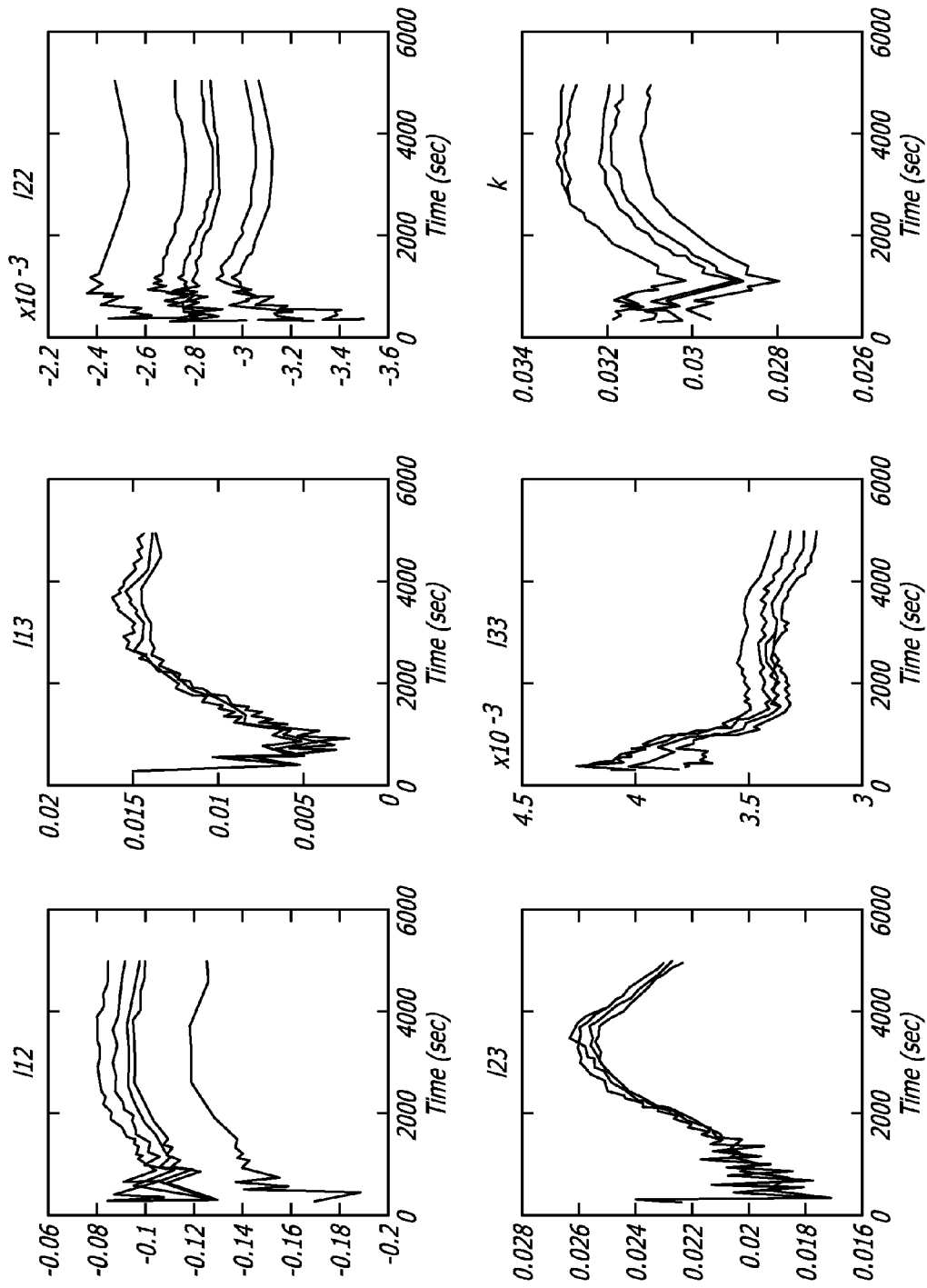
FIG. 8D shows time histories of the percentage errors of the estimated inertial matrix elements, where an estimated DCM is used and the wheel momentum is changing, in accordance with at least one embodiment of the present disclosure.

In particular, FIG. 8A shows time histories of the percentage errors of the estimated inertial matrix elements where a truth directional cosine matrix (DCM) is used and the wheel momentum is not changing, FIG. 8B shows time histories of the percentage errors of the estimated inertial matrix elements where a truth DCM is used and the wheel momentum is changing, FIG. 8C shows time histories of the percentage errors of the estimated inertial matrix elements where an estimated DCM is used and the wheel momentum is not changing, and FIG. 8D shows time histories of the percentage errors of the estimated inertial matrix elements where an estimated DCM is used and the wheel momentum is changing. The various different traces present in each of the graphs represent different update periods. It can be seen from the figures that the effects of the update period on accuracy and convergence time are not noticeable. The inertia matrix element estimates by the MOI Estimator converge in a few hundred seconds, and is independent of the parameter update periods.

An alternative form of the MOI estimator without using the variable k is:

$$\begin{bmatrix} \varphi_1^T & -1 & 0 & 0 \\ \varphi_2^T & 0 & -1 & 0 \\ \varphi_3^T & 0 & 0 & -1 \end{bmatrix} \begin{bmatrix} \theta \\ H_1 \\ H_2 \\ H_3 \end{bmatrix} = -C_b^{eci} h_{whl} \Leftrightarrow \tilde{\varphi}^T \tilde{\theta} = y$$

where $\theta = [I_{11}, I_{12}, I_{13}, I_{22}, I_{23}, I_{33}]$ $$\varphi_i^T = \begin{bmatrix} C_{i1}\omega_1, C_{i1}\omega_2 + C_{i2}\omega_1, C_{i1}\omega_3 + C_{i3}\omega_1, \\ C_{i2}\omega_2, C_{i2}\omega_3, C_{i3}\omega_2, C_{i3}\omega_3 \end{bmatrix}$$

Solar Wing Current Based Rate and Quaternion Estimator

The proposed Rate and Quaternion Estimator for estimating the spacecraft body angular rate and quaternion uses only solar wing current measurements without the need of any other sensors. This Solar Wing Current Based Rate and Quaternion Estimator consists of the following equations:

$$\dot{\hat{\omega}} = -\hat{I}^{-1}[\hat{\omega} \times (\hat{I}\hat{\omega} + h_{whl}) + \hat{\tau}] + \theta \quad (7)$$

$\dot{\hat{q}} = \hat{M}(\hat{\omega} + \xi)$ $\theta = -k_\theta \hat{I}[(\hat{I}\hat{\omega} + h_{whl}) - \hat{C}_{SZ}^b {}^{SZ} H]$ $\xi = -2k_\xi I_{max} k_c \hat{M}^T (\hat{c} - c_m) P\hat{q} - k_\xi \hat{M}^T \zeta$ where $\hat{\omega}$ is the angular rate vector estimate, $\hat{I}$ is the estimated spacecraft inertia matrix, $h_{whl}$ is reaction wheel momentum, $\hat{\tau} = {}^b\tau_{whl} - {}^b\tau_{ext}$ is the difference between the wheel torque and the knowledge external torque (all quantities are expressed in a spacecraft body fixed coordinate frame), $k_\theta, k_\xi$ and $k_c$ are positive scalar estimator constants, $\theta$ and $\xi$ are error correction terms, SZ is an arbitrary inertial fixed coordinate frame with its z-axis pointing to sun, $\hat{q}=[\hat{q}_1,\hat{q}_2,\hat{q}_3,\hat{q}_4]^T$ is the estimate of the spacecraft fixed body frame to the SZ frame transformation quaternion. It can be shown that the solar wing current can be expressed as $c=2I_{max}(q_1 q_2 + q_3 q_4)$, assuming the solar wing current is $c=I_{max} \cos\phi$, where $\phi$ is the angle between the spacecraft body fixed y-axis and the sun line. In Equation (7), $\hat{c}=2I_{max}(\hat{q}_1\hat{q}_2+\hat{q}_3\hat{q}_4)=I_{max}\hat{q}^T P\hat{q}$ is the estimated wing current, $c_m$ is the measured wing current, and $$P = \begin{bmatrix} 0 & 1 & 0 & 0 \\ 1 & 0 & 0 & 0 \\ 0 & 0 & 0 & 1 \\ 0 & 0 & 1 & 0 \end{bmatrix}, \quad \hat{M} = 0.5 \begin{bmatrix} -\hat{q}_2 & -\hat{q}_3 & -\hat{q}_4 \\ \hat{q}_1 & -\hat{q}_4 & \hat{q}_3 \\ \hat{q}_4 & \hat{q}_1 & -\hat{q}_2 \\ -\hat{q}_3 & \hat{q}_2 & \hat{q}_1 \end{bmatrix},$$

$\zeta = [\zeta_1, \zeta_2, \zeta_3, \zeta_4]^T$ and $\zeta_j = [\hat{C}_b^{SZ}(\hat{I}\hat{\omega} + h_{whl}) - {}^{SZ}H]^T \hat{C}_{b,i}^{SZ}(\hat{I}\hat{\omega} + h_{whl}), \quad j = 1, \ldots, 4$ where $\hat{C}_{b,i}^{SZ} = \dfrac{d}{d\hat{q}_i} \hat{C}_b^{SZ}$ Note that the quaternion used here assumes the following format $q=[\cos(\rho/2); \sin(\rho/2) u]$, where $\rho$ is the rotation angle and u is the unit vector along the rotation axis.

Figure 9:
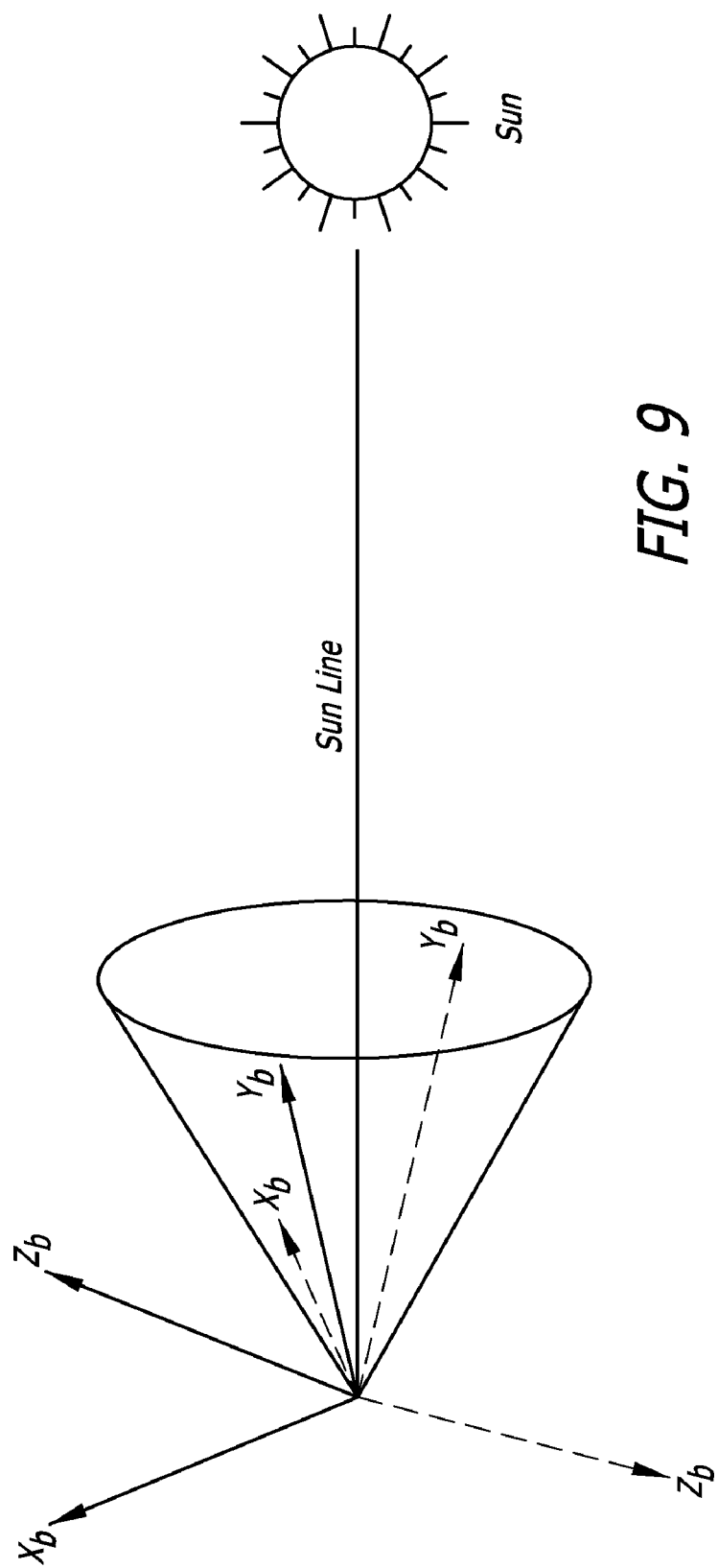
FIG. 9 shows a depiction of the non-uniqueness of the candidate coordinates frames, in accordance with at least one embodiment of the present disclosure.

Derivation of the Estimator. In one or more embodiments, FIG. 9 shows a depiction of the non-uniqueness of the candidate coordinates frames. In this figure, all spacecraft attitudes with their y-axes on the cone have the same y-axis to the sun line angle. Hence, all of the solar wing currents that are generated will be of the same magnitude, assuming maximum current is obtained when the y-axis coincides with the sun line.

As shown in FIG. 9, because the magnitude of the solar wing current is assumed to be proportional to the cosine value of the angle between the spacecraft body fixed y-axis and the sun line, the spacecraft attitudes that generate the same measured wing current are not unique. In order to have a unique solution, the selected cost function contains an angular momentum error term in additional to the wing current error term $(\hat{c}-c_m)^2$ as shown in Equation (8).

$$L(\hat{q},\hat{\omega}) = \frac{1}{2}k_c(\hat{c}-c_m)^2 + \frac{1}{2}\left\|\hat{C}_b^{SZ}(\hat{I}\hat{\omega}+h_{whl}) - {}^{SZ}H\right\|^2 \qquad (8)$$

Although spacecraft attitude and angular rate still cannot be uniquely determined from a given angular momentum, the relationship between rate and quaternion stipulated by Equation (7) should be able to force the existence of a uniqueness solution when the correction terms are zero.

Differentiation of L in Equation (8) with respect to time gives, $$\frac{dL}{dt} = \frac{\partial L}{\partial \hat{q}}\frac{d\hat{q}}{dt} + \frac{\partial L}{\partial \hat{\omega}}\frac{d\hat{\omega}}{dt} - k_c(\hat{c}-c_m)\frac{dc_m}{dt} = F + G^T\theta + W^T\xi$$

where $$F = -k_c(\hat{c}-c_m)\dot{c}_m + 2I_{max}(\hat{c}-c_m)\hat{\omega}^T\hat{M}^T(P\hat{q}+\zeta) -$$
$$(\hat{I}\hat{\omega}+h_{whl}-\hat{C}_{SZ}^{b}{}^{SZ}H)^T[\hat{\omega}\times(\hat{I}\hat{\omega}+h_{whl})+\hat{\tau}]$$

$$G = \hat{I}(\hat{I}\hat{\omega}+h_{whl}-\hat{C}_{SZ}^{b}{}^{SZ}H)$$

$$W = 2I_{max}k_c\hat{M}^T(\hat{c}-c_m)P\hat{q}+\hat{M}^T\zeta$$

Hence, the optimal choice of $\theta$ and $\xi$ to minimize the cost function L is $\theta=-k_\theta G$ and $\xi=-k_\xi W$ for some $k_\theta>0$ and $k_\xi>0$ as shown in Eq. (7). With such a choice, one has $$\frac{dL}{dt} = F - k_\theta\|G\|^2 - k_\xi\|W\|^2 < 0 \text{ when } F < k_\theta\|G\|^2 + k_\xi\|W\|^2$$

The above does not show the stability of the estimator. However, it can be shown that Equation (7) is stable locally by examining the Taylor series of dL/dt.

$$\frac{dL(\hat{q},\hat{\omega})}{dt} = \left(\frac{dL}{dt}\right)_{\substack{\hat{\omega}=\omega^*\\\hat{q}=q^*}} + \left(\nabla_{\hat{\omega}}^T\frac{dL}{dt}\right)_{\substack{\hat{\omega}=\omega^*\\\hat{q}=q^*}}(\hat{\omega}-\omega^*) + \qquad (9)$$

$$\frac{1}{2}(\hat{\omega}-\omega^*)^T\left(\nabla_{\hat{\omega}}\nabla_{\hat{\omega}}^T\frac{dL}{dt}\right)_{\substack{\hat{\omega}=\omega^*\\\hat{q}=q^*}}(\hat{\omega}-\omega^*) +$$

$$\left(\nabla_{\hat{q}}^T\frac{dL}{dt}\right)_{\substack{\hat{\omega}=\omega^*\\\hat{q}=q^*}}(\hat{q}-q^*) + \frac{1}{2}(\hat{q}-q^*)^T\left(\nabla_{\hat{q}}\nabla_{\hat{q}}^T\frac{dL}{dt}\right)_{\substack{\hat{\omega}=\omega^*\\\hat{q}=q^*}}(\hat{q}-q^*) +$$

$$(\hat{\omega}-\omega^*)^T\left(\nabla_{\hat{\omega}}\nabla_{\hat{q}}^T\frac{dL}{dt}\right)_{\substack{\hat{\omega}=\omega^*\\\hat{q}=q^*}}(\hat{q}-q^*) + O\left(\left\|\begin{bmatrix}\hat{\omega}-\omega^*\\\hat{q}-q^*\end{bmatrix}\right\|^3\right)$$

where $q^*$ and $\omega^*$ are the truth quaternion and angular rate vectors. It can be shown that $$\left(\frac{dL}{dt}\right)_{\substack{\hat{\omega}=\omega^*\\\hat{q}=q^*}} = 0'$$

$$\left(\nabla_{\hat{\omega}}\frac{dL}{dt}\right)_{\substack{\hat{\omega}=\omega^*\\\hat{q}=q^*}} = 0_{3\times 1}$$

$$\left(\nabla_{\hat{q}}\frac{dL}{dt}\right)_{\substack{\hat{\omega}=\omega^*\\\hat{q}=q^*}} = 0'_{4\times 1}$$

$$\left(\nabla_{\hat{\omega}}\nabla_{\hat{\omega}}^T\frac{dL}{dt}\right)_{\substack{\hat{\omega}=\omega^*\\\hat{q}=q^*}} = k_\theta\hat{I}^4 - k_\xi\sum_{i=1}^{4}N_iN_i^T,$$

$$\left(\nabla_{\hat{q}}\nabla_{\hat{q}}^T\frac{dL}{dt}\right)_{\substack{\hat{\omega}=\omega^*\\\hat{q}=q^*}} = -k_\xi RR^T,$$

$$\left(\nabla_{\hat{\omega}}\nabla_{\hat{q}}^T\frac{dL}{dt}\right)_{\substack{\hat{\omega}=\omega^*\\\hat{q}=q^*}} = 0_{3\times 4}$$

where $R_{4\times 3} = \begin{bmatrix}r_1\\r_2\\r_3\\r_4\end{bmatrix}$, $r_i$ is $1\times 3$ row vector, $$N_i = \left[\hat{C}_{SZ}^{b}\hat{C}_{b,i}^{SZ}(\hat{I}\hat{\omega}+h_{whl})\right]\hat{m}_i,$$

$$r_i = \sum_{j=1,4}(\hat{I}\hat{\omega}+h_{whl})^T\hat{C}_{b,i}^{SZ}\hat{C}_{b,j}^{SZ}(\hat{I}\hat{\omega}+h_{whl})\hat{m}_i,$$

$\hat{m}_i$ is the $i$-th row of $\hat{M}$

Hence, the matrix $$-\begin{bmatrix}\nabla_{\hat{\omega}}\nabla_{\hat{\omega}}^T\frac{dL}{dt} & \nabla_{\hat{\omega}}\nabla_{\hat{q}}^T\frac{dL}{dt}\\\nabla_{\hat{q}}\nabla_{\hat{\omega}}^T\frac{dL}{dt} & \nabla_{\hat{q}}\nabla_{\hat{q}}^T\frac{dL}{dt}\end{bmatrix}_{\substack{\hat{\omega}=\omega^*\\\hat{q}=q^*}}$$

is positive definite. So, when $\hat{q}$ and $\hat{\omega}$ are sufficiently close to the truth values $q^*$ and $w^*$, one has $$\frac{dL(\hat{q},\hat{\omega})}{dt} < 0,$$

which means the local stability of the Wing Current Based Rate and Quaternion Estimator. Note that the stability here means that the rate and quaternion estimates stay close to their truth values.

Figure 10A:
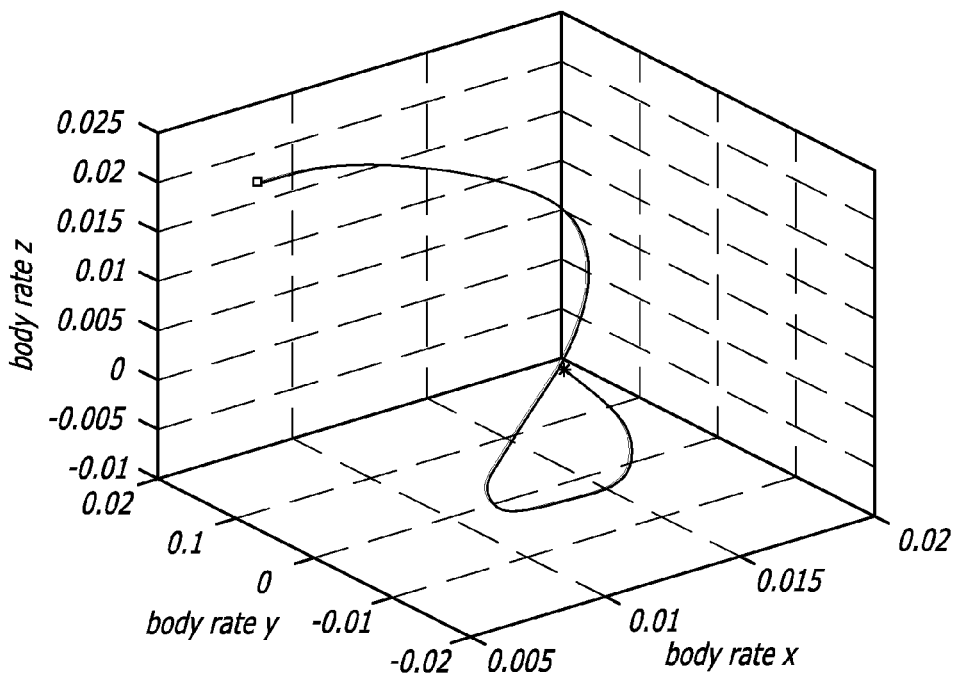
FIG. 10A shows a three-dimensional (3D) trajectory of the angular rate vector, where the rate and quaternion estimates coincide with truth values with truth initial conditions, in accordance with at least one embodiment of the present disclosure.
Figure 10B:
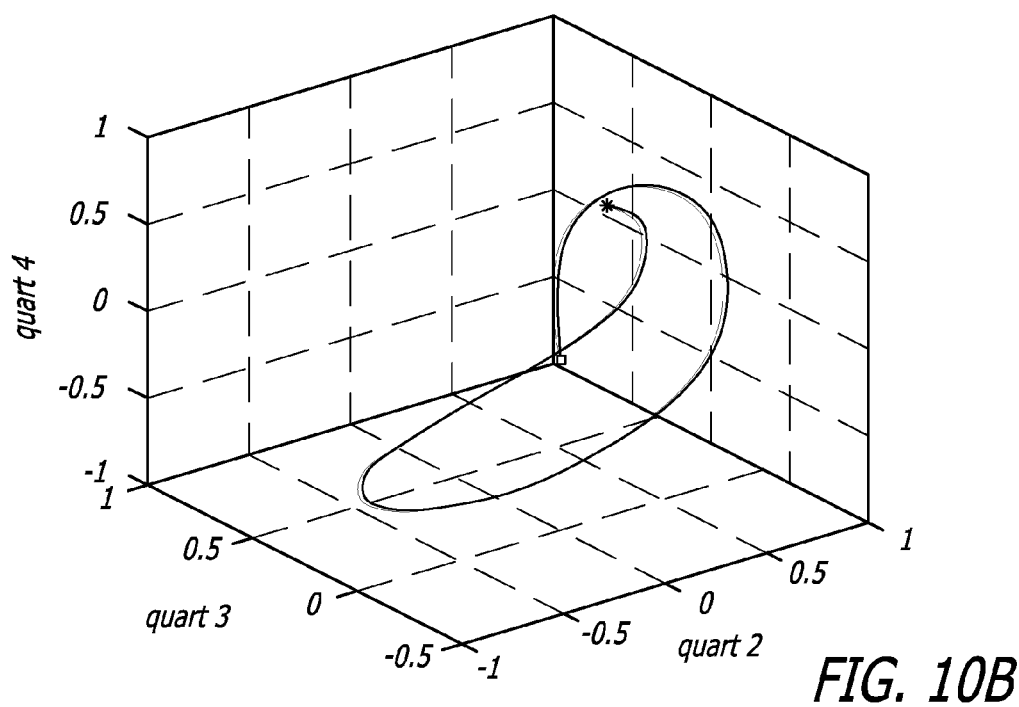
FIG. 10B shows a 3D trajectory of the last three elements of quaternion, where the rate and quaternion estimates coincide with truth values with truth initial conditions, in accordance with at least one embodiment of the present disclosure.

Two Simulink simulations were performed to verify the stability and convergence properties of the disclosed Solar Wing Current Based Rate and Quaternion Estimator. In at least one embodiment, FIGS. 10A and 10B verify the stability of the estimator by using truth initial conditions. In particular, FIG. 10A shows a 3D trajectory of the angular rate vector where the rate and quaternion estimates coincide with truth values with truth initial conditions, and FIG. 10B shows a 3D trajectory of the last three elements of quaternion, where the rate and quaternion estimates coincide with truth values with truth initial conditions. For these figures, the solid line represents truth values, and the bold line represents estimated values. As shown in these figures, the estimated angular rate and quaternion vectors coincide with the true values in the plots throughout the simulation, and no sign of divergence was observed.

Figure 11A:
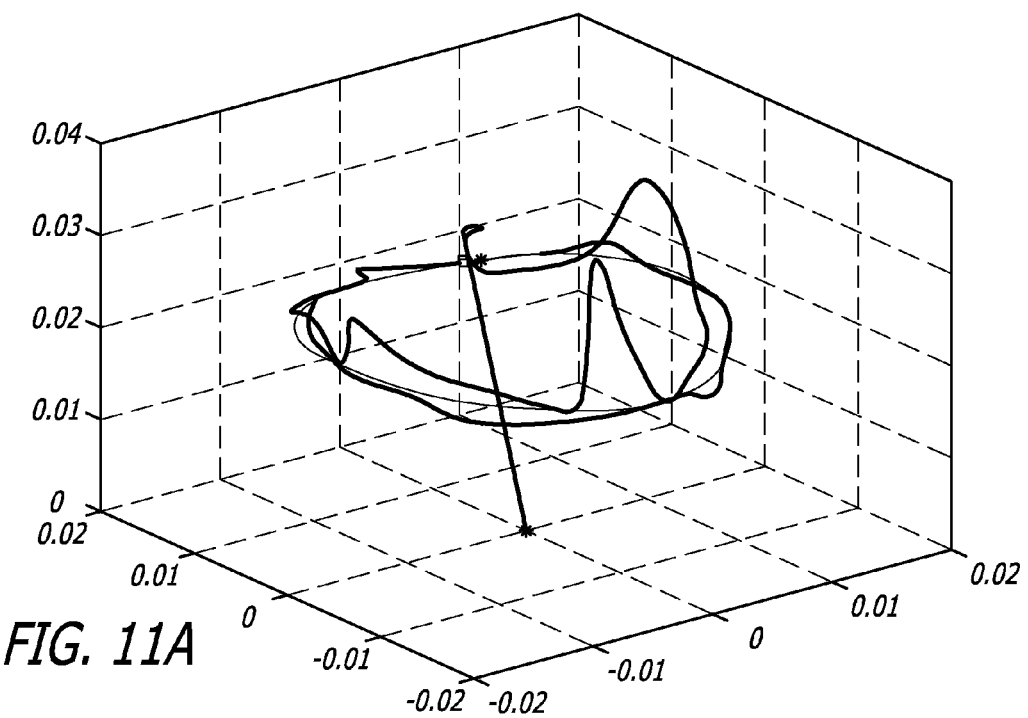
FIG. 11A shows a 3D trajectory of the angular rate vector, where the rate and quaternion estimates converge to the truth values with perturbed initial conditions, in accordance with at least one embodiment of the present disclosure.
Figure 11B:
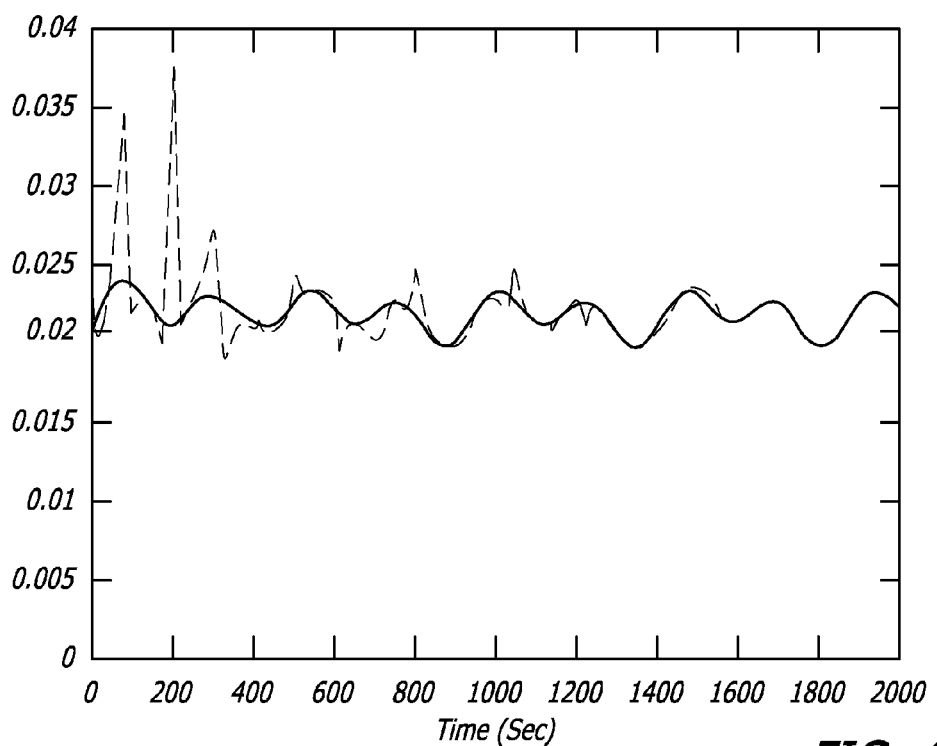
FIG. 11B shows the third component of the rate vector, where the rate and quaternion estimates converge to the truth values with perturbed initial conditions, in accordance with at least one embodiment of the present disclosure.
Figure 11C:
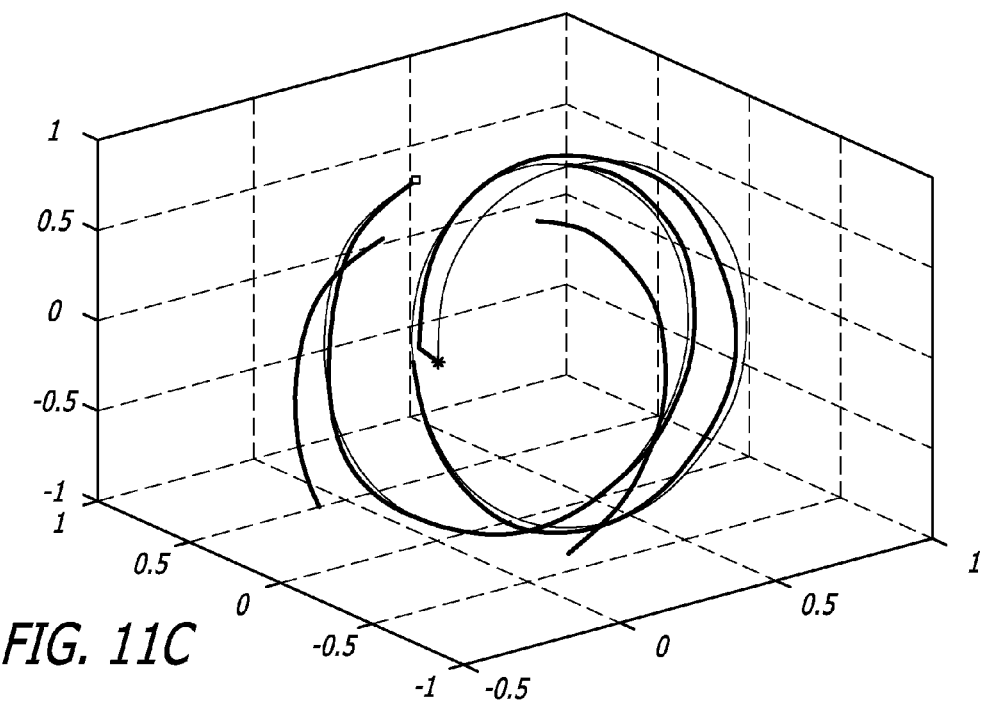
FIG. 11C shows a 3D trajectory of the q(2,3,4), where the rate and quaternion estimates converge to the truth values with perturbed initial conditions, in accordance with at least one embodiment of the present disclosure.
Figure 11D:
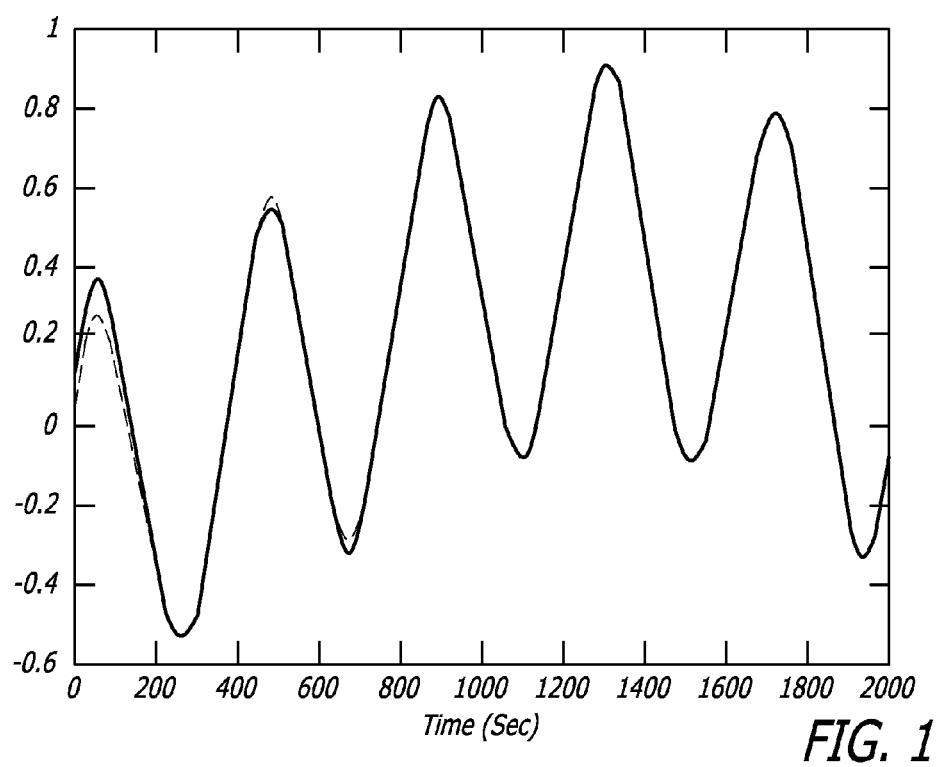
FIG. 11D shows the fourth component of the quaternion, where the rate and quaternion estimates converge to the truth values with perturbed initial conditions, in accordance with at least one embodiment of the present disclosure.

In one or more embodiments, FIGS. 11A, 11B, 11C, and 11D show the convergence of the estimator by using perturbed initial conditions. Specifically, FIG. 11A shows a 3D trajectory of the angular rate vector where the rate and quaternion estimates converge to the truth values with perturbed initial conditions, FIG. 11B shows the third component of the rate vector where the rate and quaternion estimates converge to the truth values with perturbed initial conditions, FIG. 11C shows a 3D trajectory of the q(2,3,4), where the rate and quaternion estimates converge to the truth values with perturbed initial conditions, and FIG. 11D shows the fourth component of the quaternion, where the rate and quaternion estimates converge to the truth values with perturbed initial conditions. For FIGS. 11A and 11C, the solid trace represents the truth values, and the bold trace represents the estimated values. Also, in these figures, the asterisk (*) denotes the starting point of the trace, and the square box icon indicates the ending point of the trace. For FIGS. 11B and 11D, the solid line represents truth values, and the dashed line represents estimated values. From these figures, the estimated angular rate and quaternion vectors are shown to converge to their truth values.

Simulation Results

This section demonstrates how the proposed Solar Wing Current Based Rate and Quaternion Estimator (R&Q Estimator) described by Equation (7) can be used to drive the spacecraft to place the satellite solar panels at their maximum power receiving attitude without using any sensors and using only wing current feedback and ephemeris knowledge of sun unit vector.

Two simulations are performed for the sun acquisition maneuver scenario, one using Simulink and the other using the high fidelity nonlinear model. The rate and quaternion estimates generated by the R&Q Estimator are used in the Spin Controller in Equation (1) for the maneuver. The sun unit vector ephemeris knowledge and the desired sun line spin rate are used to calculate the offset angular momentum shown in FIG. 9. The derivative of the offset momentum is used as the torque commands to the reaction wheels. Discrete approximation of the derivative is used in implementation.

Simulink Simulation. The sun acquisition maneuver starts at 200 seconds from a key hole attitude, i.e., a satellite orientation where the solar wing cannot view the sun. The initial angular rate and quaternion estimates are assumed to contain no error when the maneuver starts. The MOI Estimator generated inertia matrix estimate is used in the Spin Controller and the R&Q Estimator.

Figure 12A:
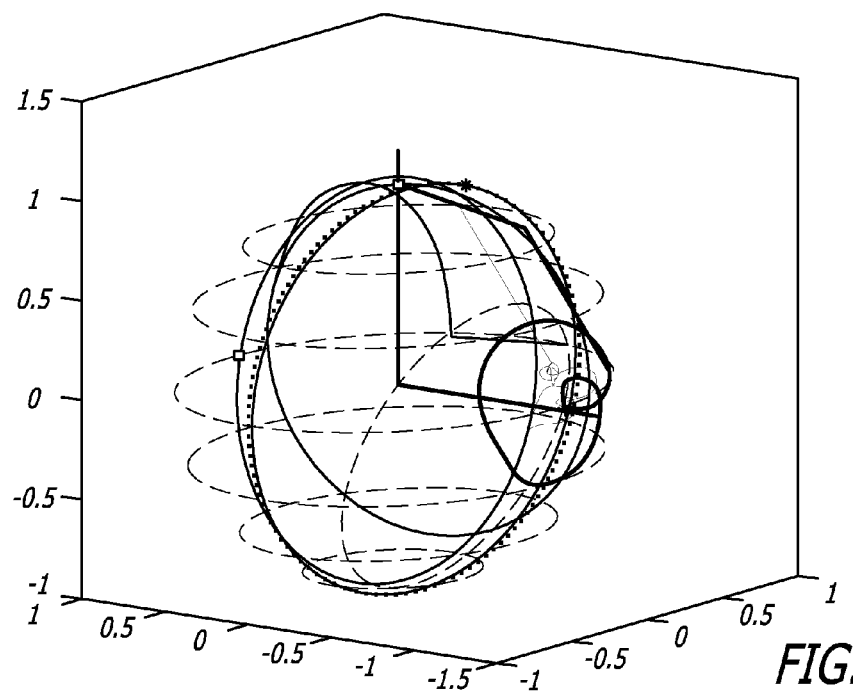
FIG. 12A shows the angular rate approaching momentum for Simulink simulation results for the Key Hole Sun Acquisition maneuver using the Spin Controller, the MOI Estimator, and the Wing Current Rate and Quaternion Estimator, in accordance with at least one embodiment of the present disclosure.
Figure 12B:
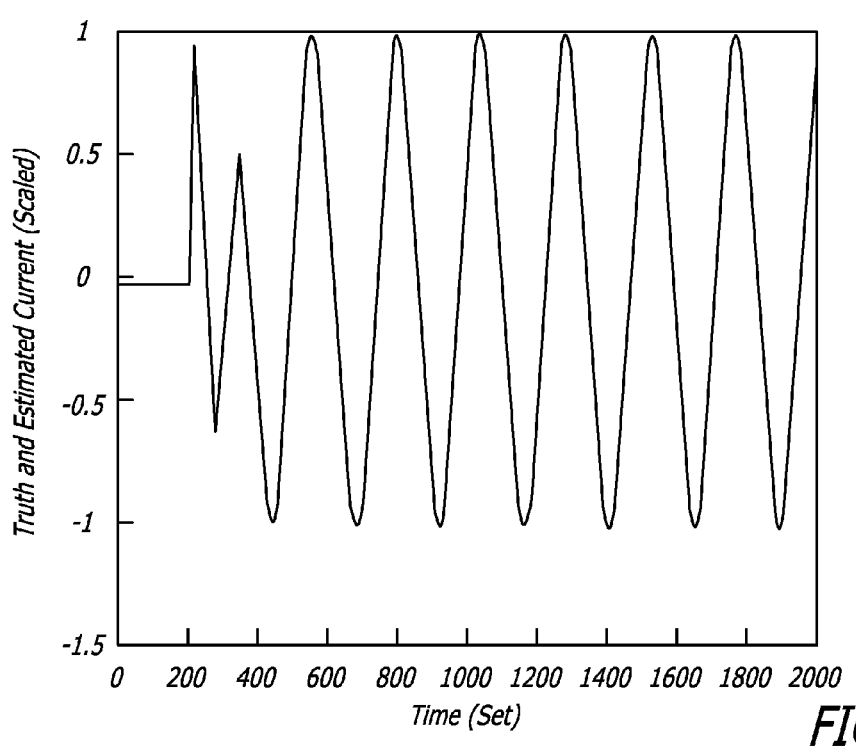
FIG. 12B shows the truth and estimated wing current for Simulink simulation results for the Key Hole Sun Acquisition maneuver using the Spin Controller, the MOI Estimator, and the Wing Current Rate and Quaternion Estimator, in accordance with at least one embodiment of the present disclosure.
Figure 12C:
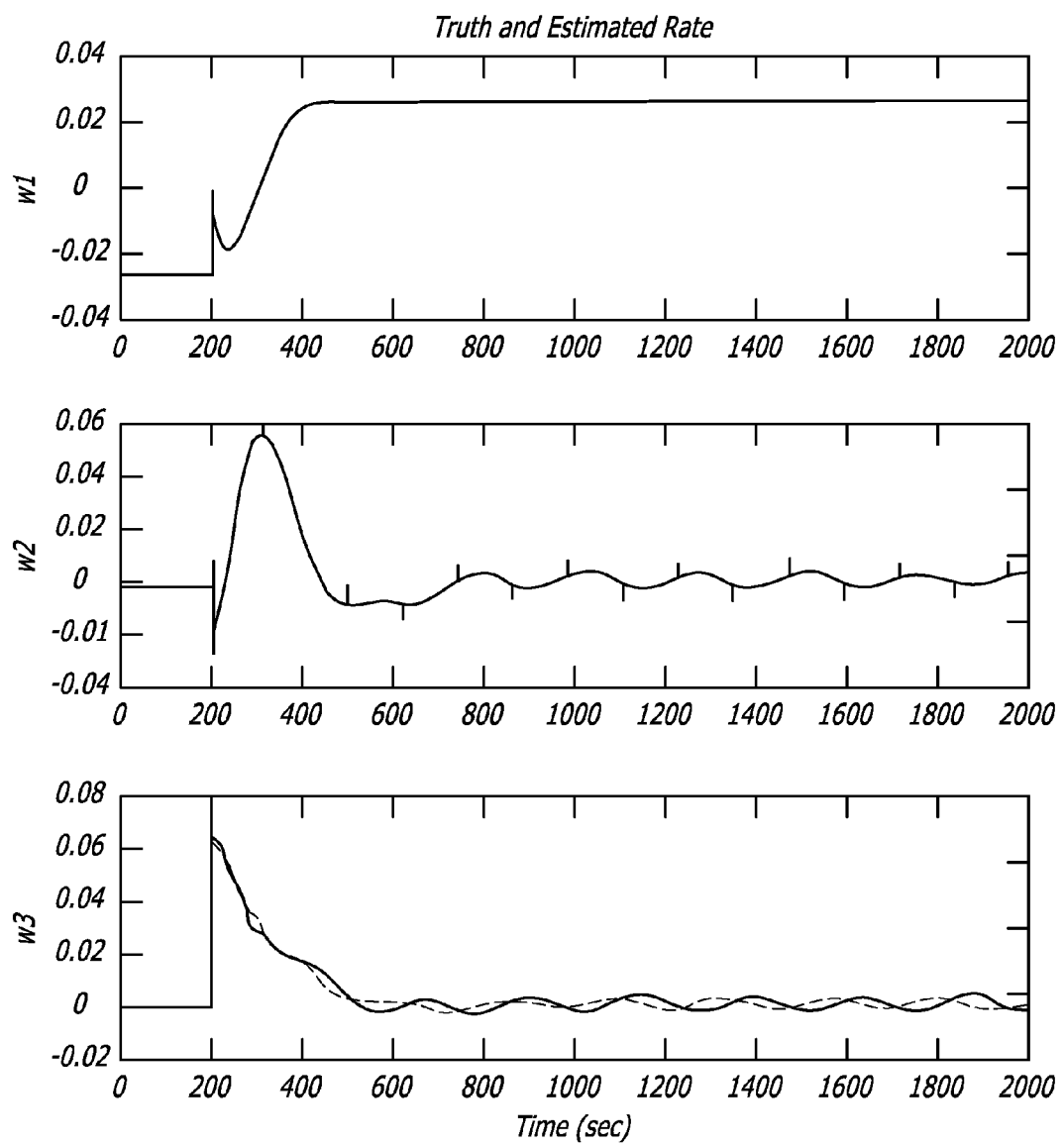
FIG. 12C shows the truth and estimated angular rate for Simulink simulation results for the Key Hole Sun Acquisition maneuver using the Spin Controller, the MOI Estimator, and the Wing Current Rate and Quaternion Estimator, in accordance with at least one embodiment of the present disclosure.
Figure 12D:
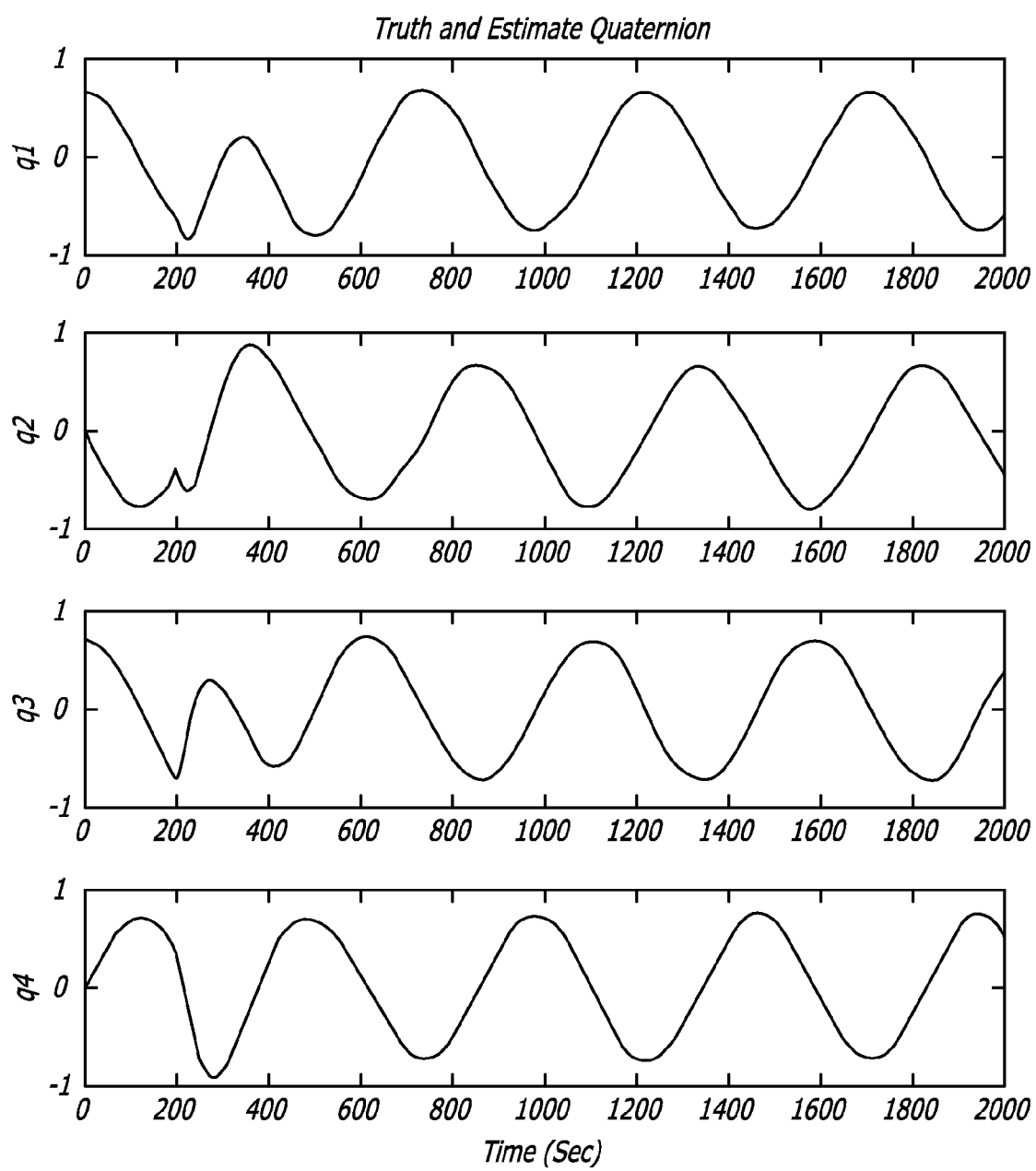
FIG. 12D shows the truth and estimated quaternion for Simulink simulation results for the Key Hole Sun Acquisition maneuver using the Spin Controller, the MOI Estimator, and the Wing Current Rate and Quaternion Estimator, in accordance with at least one embodiment of the present disclosure.

The simulation results are plotted in FIGS. 12A, 12B, 12C, and 12D. Specifically, FIG. 12A shows the angular rate approaching momentum for Simulink simulation results for the Key Hole Sun Acquisition maneuver using the Spin Controller, the MOI Estimator, and the Wing Current Rate and Quaternion Estimator; FIG. 12B shows the truth and estimated wing current for Simulink simulation results for the Key Hole Sun Acquisition maneuver using the Spin Controller, the MOI Estimator, and the Wing Current Rate and Quaternion Estimator; FIG. 12C shows the truth and estimated angular rate for Simulink simulation results for the Key Hole Sun Acquisition maneuver using the Spin Controller, the MOI Estimator, and the Wing Current Rate and Quaternion Estimator; and FIG. 12D shows the truth and estimated quaternion for Simulink simulation results for the Key Hole Sun Acquisition maneuver using the Spin Controller, the MOI Estimator, and the Wing Current Rate and Quaternion Estimator.

For FIG. 12A, the trajectory starts at the square box icon and ends at the asterisk (*). Also for FIG. 12A, the dotted trace represents spacecraft momentum in ECI, the bold trace represents the unit vector $\omega$ in ECI, the solid trace represents the spacecraft body y-axis in ECI, and the dashed trace shows the last 200 seconds of the solid trace. For FIGS. 12B, 12C, and 12D, the dashed trace shows the truth values, and the solid trace shows the estimated values. It can be seen from the wing current plot, FIG. 12B, that the solar wing current is zero at beginning, and it starts to generate current when the maneuver begins. The wing current reaches steady state at about 600 seconds. The plots in FIGS. 12C and 12D also show that the estimated angular rate and quaternion follow the truth values closely.

High Fidelity Nonlinear Simulation. In this simulation scenario, a gyro is assumed to fail at 500 seconds, and the sun acquisition maneuver starts immediately after the gyro failure. The angular rate and quaternion estimates at the time of failure are used to initialize the R&Q Estimator, and are used to calculate the total angular momentum in the SZ-frame (an inertial fixed coordinate frame with the z-axis pointing to sun). The calculated momentum is used in the correction term $\omega$ in the estimator Equation (7). The inertia matrix estimate used has 3% error in diagonal elements and 10% error in off-diagonal elements, which were obtained in an earlier simulation run.

Figure 13A:
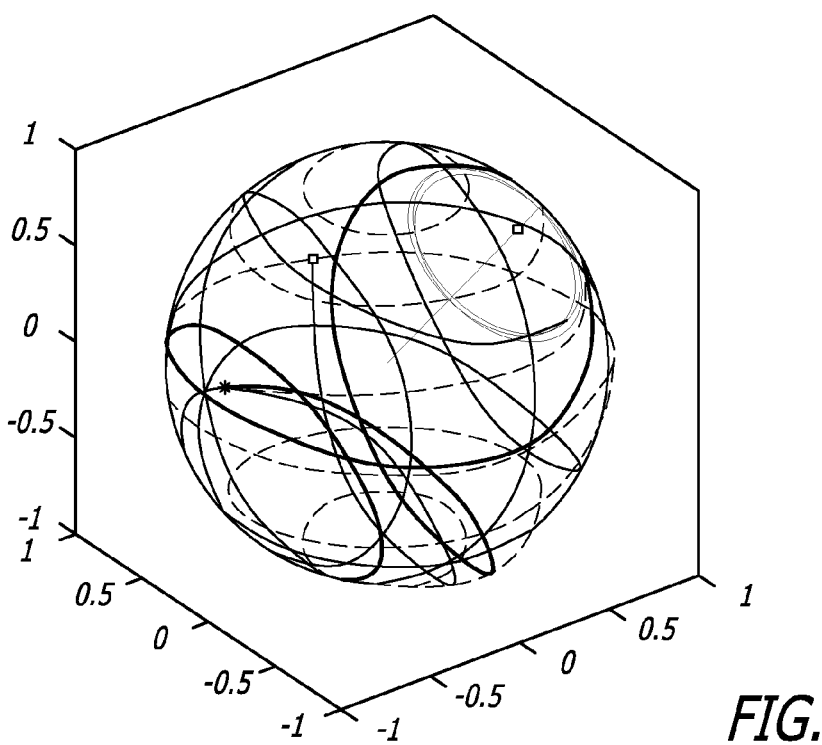
FIG. 13A shows that wobble occurs when uncontrolled for high fidelity nonlinear simulation results for a Sun Acquisition maneuver using the Spin Controller, the MOI Estimator, and the Solar Wing Current Based Rate and Quaternion Estimator, in accordance with at least one embodiment of the present disclosure.
Figure 13B:
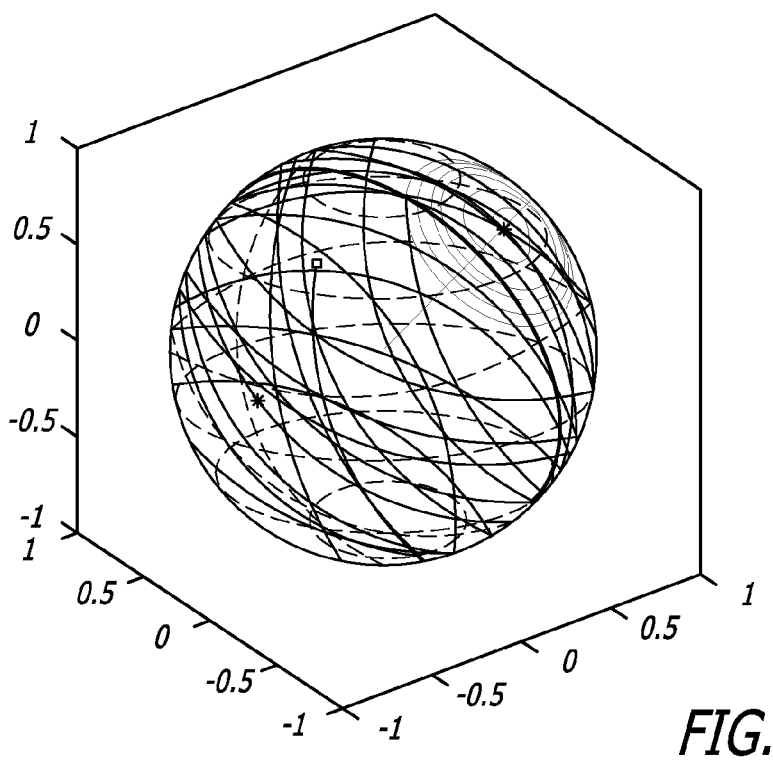
FIG. 13B shows that spin axis spirals to a constant vector; i.e., angular rate vector approaches commanded momentum for high fidelity nonlinear simulation results for a Sun Acquisition maneuver using the Spin Controller, the MOI Estimator, and the Solar Wing Current Based Rate and Quaternion Estimator, in accordance with at least one embodiment of the present disclosure.
Figure 13C:
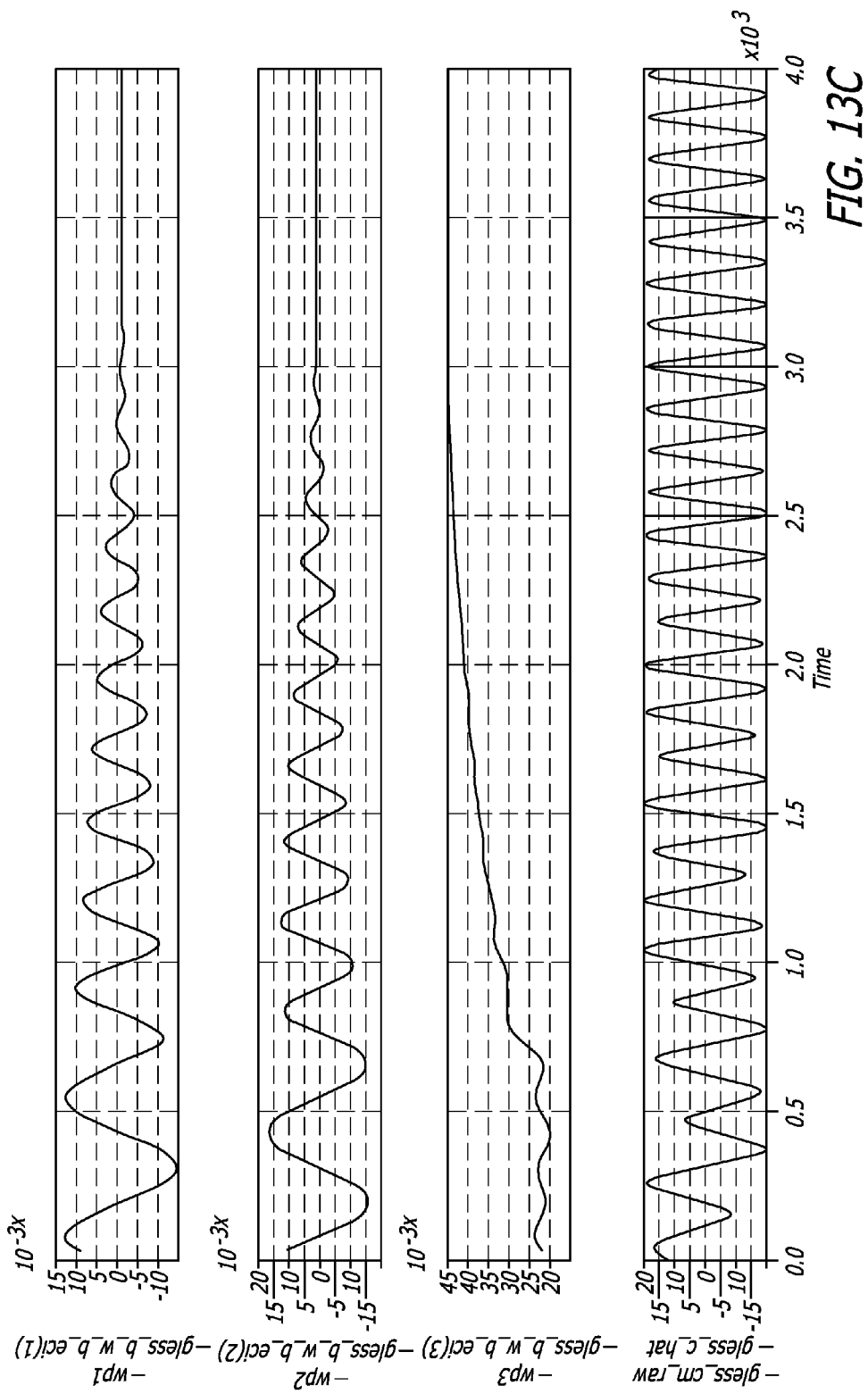
FIG. 13C shows truth and estimated spacecraft body angular rate (rad/s) and solar wing current for high fidelity nonlinear simulation results for a Sun Acquisition maneuver using the Spin Controller, the MOI Estimator, and the Solar Wing Current Based Rate and Quaternion Estimator, in accordance with at least one embodiment of the present disclosure.

The simulation results are plotted in FIGS. 13A, 13B, and 13C. In particular, FIG. 13A shows that wobble occurs when uncontrolled for high fidelity nonlinear simulation results, for a Sun Acquisition maneuver using the Spin Controller, the MOI Estimator, and the Solar Wing Current Based Rate and Quaternion Estimator. For FIG. 13A, the trajectory starts at the square box icon and ends at the asterisk (*). Also for FIG. 13A, the faint trace represents the unit vector of angular rate in ECI, the solid trace represents the spacecraft body y-axis in ECI, and the bold trace represents the last 200 seconds of the solid trace to show convergence.

Also, FIG. 13B shows that spin axis spirals to a constant vector; i.e., angular rate vector approaches commanded momentum, for high fidelity nonlinear simulation results for a Sun Acquisition maneuver using the Spin Controller, the MOI Estimator, and the Solar Wing Current Based Rate and Quaternion Estimator. For FIG. 13B, the faint trace represents the angular rate vector, which is in the form of a spiral, as it approaches to commanded momentum. The plot in this figure also shows that the estimated angular rates follow the truth values closely throughout the simulation, and the spin axis spirals to reach the desired rate vector specified by the target momentum vector that points to sun.

In addition, FIG. 13C shows truth and estimated spacecraft body angular rate (rad/s) and solar wing current for high fidelity nonlinear simulation results, for a Sun Acquisition maneuver using the Spin Controller, the MOI Estimator, and the Solar Wing Current Based Rate and Quaternion Estimator. For this figure, the solid traces represent the truth values, and the dashed traces represent the spacecraft body angular rate (rad/s) and solar wing current. It can be seen from the solar wing current plot that the sun acquisition maneuver takes about 2,500 seconds to accomplish, as indicated by the wing current reaching its sinusoidal steady state. The acquisition time is much longer than the Simulink result because a realistic wheel torque capability is used in the simulation. The peak value of the steady state solar wing current is not the maximum possible value because the spacecraft body fixed z-axis does not coincide exactly with the minor axis of its inertia matrix (the minor axis is the steady state spin axis, and the body fixed y-axis needs to point to the sun exactly to generate maximum current).

CONCLUSION

The present disclosure teaches a system and method for satellite-saving sun acquisition maneuver using only solar wing current feedback. The preliminary study of the method shows very promising results. The disclosed Spin Controller can be very useful for the spacecraft maneuvers in changing its orientation and spin axis. It has a simple structure, and there are no stability issues as long as the spacecraft inertia matrix and the angular rate estimates with adequate accuracy are available. The proposed Solar Wing Based Rate and Quaternion Estimator is sensitive to the accuracy of the inertia matrix, and that is why the proposed Moment of Inertia Estimator is needed. Including the magnitudes of error correction terms in the cost function described in Equation (8) and/or the use of a sun sensor may improve the performance, enlarge the domain of attraction, and eliminate the need of sun ephemeris.

There are several prior art methods for the intermediate axis spin stabilization, e.g., using two linear controls about the major and minor axes or a single nonlinear control about the minor axis. The disclosed Spin Controller provides a unified treatment for the stabilization of any of the three principle axes as shown in the Appendix. In additional to the stabilization purpose, the disclosed controller can be used to shift a spinning axis to any of the three principle axes from any initial angular rate vector. The stabilization of intermediate axis spin can be useful in the sun acquisition maneuver when the total spacecraft angular momentum vector is aligned with or has a small angle to the sun line. In this situation, commanding the spacecraft directly to an intermediate axis spin allows one solar wing panel to face the sun without using an offset angular momentum. Otherwise, a large offset momentum is needed to move the momentum vector perpendicular to sun line for major or minor axis spin; the required offset momentum may be beyond the capacity of reaction wheels.

APPENDIX

The disclosed Spin Controller can be used to stabilize spinning about any of the three principle axes including the intermediate axis spin if a matrix gain value is used as stated below.

Theorem 2. Assume $I_1 > I_2 > I_3$ be the three eigenvalues of the inertia matrix of the rigid body to be controlled and $\omega$ be the rotational rate at equilibrium. Let the critical gain values for the three principal axes be $$k_1^* = -\sqrt{\frac{I_2 I_3}{\omega^2(I_1 - I_2)(I_1 - I_3)}},$$

$$k_2^* = \sqrt{\frac{I_1 I_3}{\omega^2(I_1 - I_2)(I_2 - I_3)}}, \text{ and}$$

$$k_3^* = \sqrt{\frac{I_1 I_2}{\omega^2(I_1 - I_3)(I_2 - I_3)}}$$

respectively, then the Spin Controller ${}^b h_{ctrl} = K_{ctrl}({}^b I {}^b \omega_{eci}^b \times {}^b \omega_{eci}^b) + {}^b h_{offset}$ with a matrix gain value $K_{ctrl} = C \text{ diag}([k_1, k_2, k_3])C^T$, where C satisfies $I = C^T \text{diag}([I_1, I_2, I_3])C$ has the following properties when the magnitude of the product of the major and minor gains is smaller than the square of the critical value of the intermediate axis $|k_1 k_3| < k_2^{*2}$:

If $k_1 < 0$, $k_2 < 0$, and $k_3 < 0$, the major axis rotation is the only stable equilibrium.

If $k_1 > 0$, $k_2 > 0$, and $k_3 > 0$, the minor axis rotation is the only stable equilibrium.

If $k_1 < -1/(k_3 \omega^2)$, $k_2 = k_3$, and $k_3 > 0$, the intermediate axis rotation is a stable equilibrium, the major axis rotation and the minor axis rotation are unstable equilibriums, where $\omega$ is the intermediate axis spin rate.

If $k_1 > 0$, $k_2 = k_1$, and $k_3 < -1/(k_1 \omega^2)$, the intermediate axis rotation is the only stable equilibrium, where $\omega$ is the intermediate axis spin rate.

Proof. Following the proof given in Theorem 1, assume a tiny perturbation perturbation to the equilibrium $\omega = [\omega_1, 0, 0]^T$ occurs such that it becomes $[\omega_1 + \epsilon, \omega_2, \omega_3]^T$ with magnitudes of $\epsilon$, $\omega_2$, $\omega_3$ arbitrarily small, and at the same time $\dot{\omega}$ changes from a zero vector to $\dot{\omega} = [\dot{\omega}_1, \dot{\omega}_2, \dot{\omega}_3]^T$ with arbitrarily small magnitudes $\dot{\omega}_1$, $\dot{\omega}_2$, and $\dot{\omega}_3$, then the dynamics equation becomes $$\begin{bmatrix} J_2 & g_2 \omega_1(J_3 - J_1) \\ g_3 \omega_1(J_1 - J_2) & J_3 \end{bmatrix} \begin{bmatrix} \dot{\omega}_2 \\ \dot{\omega}_3 \end{bmatrix} = \quad (A.1)$$

$$\begin{bmatrix} g_3 \omega_1^2(J_1 - J_2) & (J_3 - J_1)\omega_1 \\ (J_1 - J_2)\omega_1 & -g_2 \omega_1^2(J_3 - J_1) \end{bmatrix} \begin{bmatrix} \omega_2 \\ \omega_3 \end{bmatrix} + h.o.t. \equiv$$

$$M \begin{bmatrix} \dot{\omega}_2 \\ \dot{\omega}_3 \end{bmatrix} + h.o.t. \Rightarrow \begin{bmatrix} \dot{\omega}_2 \\ \dot{\omega}_3 \end{bmatrix} \frac{PM}{d} \begin{bmatrix} \omega_2 \\ \omega_3 \end{bmatrix} + h.o.t.,$$

$$P = \begin{bmatrix} J_3 & -g_2 \omega_1(J_3 - J_1) \\ -g_3 \omega_1(J_1 - J_2) & J_2 \end{bmatrix},$$

where $d = J_2 J_3 + g_2 g_3 \omega_1^2 (J_1 - J_2)(J_1 - J_3)$ h.o.t.$=O(\|[\epsilon, \omega_2, \omega_3, \dot{\omega}]\|^2)$, $J_1, J_2, J_3$ is a permutation of $I_1, I_2, I_3$, and $g_1, g_2, g_3$ are gain values of $k_1, k_2, k_3$ permuted in the same way.

The characteristic equation of the product (PM/d) in Equation (A.1) is $$\lambda^2 - [\omega_1^2 J_1((J_1 - J_3)g_2 + (J_1 - J_2)g_3)/d]\lambda - \omega_1^2(J_1 - J_2)(J_3 - J_1)(1 + g_2 g_3 \omega_1^2)/d = 0$$

which has roots $$\lambda = \frac{1}{2}(A \pm \sqrt{B}), \quad (A.2)$$

with $A = \omega_1^2 J_1((J_1 - J_3)g_2 + (J_1 - J_2)g_3)/d$ and $B = A^2 + 4\omega_1^2(J_1 - J_2)(J_3 - J_1)(1 + g_2 g_3 \omega_1^2)/d.$ From Equation (A.2), we have the following conclusions.

Case 1: $[\omega_1, 0, 0]$ is a major axis spin, i.e., $J_1 > J_2 > J_3$ or $J_1 > J_3 > J_2$ ($I_1 = J_1, I_2 = J_2, I_3 = J_3$ or $I_1 = J_1, I_2 = J_3, I_3 = J_2$).

$g_2 < 0$, $g_3 < 0 \Rightarrow d > 0$ and $A < 0$ with $|B| < A^2$ or $B < 0$, which means the major axis spin is a stable equilibrium.

$g_2 > 0$, $g_3 > 0 \Rightarrow d > 0$ and $A > 0$ with $|B| < A^2$ or $B < 0$, which means the major axis spin is an unstable equilibrium.

Case 2: $[\omega_1, 0, 0]$ is a minor axis spin, i.e., $J_3 > J_2 > J_1$ or $J_2 > J_3 > J_1$ ($I_1 = J_3, I_2 = J_2, I_3 = J_1$ or $I_1 = J_2, I_2 = J_3, I_3 = J_1$).

$g_2 < 0$, $g_3 < 0 \Rightarrow d > 0$ and $A > 0$ with $|B| < A^2$ or $B < 0$, which means the minor axis spin is an unstable equilibrium.

$g_2>0$, $g_3>0 \Rightarrow d>0$ and $A<0$ with $|B|<A^2$ or $B<0$, which means the minor axis spin is a stable equilibrium.

$g_3>0$, $g_2<-1/(g_3\omega^2)$ or $g_2>0$, $g_3<1/(g_2\omega^2) \Rightarrow 1/\omega^2<|g_2g_3|<k_3^{*2} \Rightarrow d>0$ and $|B|>A^2$, which means $\lambda$ has at least one positive root, hence the major axis spin is an unstable equilibrium.

Case 3: $[\omega_1,0,0]$ is an intermediate axis spin $g_3>0$, $g_2<-1/(g_3\omega^2)$ or $g_2>0$, $g_3<-1/(g_2\omega^2) \Rightarrow 1/\omega^2<|g_2g_3|<k_3^{*2} \Rightarrow d>0$ and $|B|>A^2$, which means $\lambda$ has at least one positive root, hence the major axis spin is an unstable equilibrium.

Either $g_2<0$, $g_3<0$ or $g_2>0$, $g_3>0$ implies $|B|>A^2$, which means $\lambda$ has at least one positive root and hence the intermediate axis spin is an unstable equilibrium.

$g_3>0$, $g_2<-1/(g_3\omega^2)$ implies $A>0$ with $|B|<A^2$ or $B<0$, which means the intermediate axis spin is an unstable equilibrium.

$g_2>0$, $g_3<-1/(g_2\omega^2)$ implies $A<0$ with $|B|<A^2$ or $B<0$, which means the intermediate axis spin is a stable equilibrium.

Case 4: $[\omega_1,0,0]$ is an intermediate axis spin with $J_2>J_1>J_3$ ($I_1=J_2$, $I_2=J_1$, $I_3=J_3$) and $|g_2g_3|<k_2^{*2}$. Again $|g_2g_3|<k_2^{*2}$ implies $d>0$ for the intermediate axis, so we can conclude the following:

Either $g_2<0$, $g_3<0$ or $g_2>0$, $g_3>0$ implies $|B|>A^2$, which means $\lambda$ has at least one positive root and hence the intermediate axis spin is an unstable equilibrium.

If $g_3>0$, $g_2<-1/(g_3\omega^2)$ implies $A<0$ with $|B|<A^2$ or $B<0$, which means the intermediate axis spin is a stable equilibrium.

If $g_2>0$, $g_3<-1/(g_2\omega^2)$ implies $A>0$ with $|B|<A^2$ or $B<0$, which means the intermediate axis spin is an unstable equilibrium. Q.E.D.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures.

We claim:

1. A method for controlling a spacecraft maneuver, the method comprising:
    generating, with a spin controller, a command by using solar wing current as the only closed-loop feedback sensor; and
    commanding, with the command, the spacecraft to change the spacecraft spin axis and spin rate.

2. The method of claim 1, wherein the spin controller commands the spacecraft to align the spacecraft spin axis to an inertial fixed direction, and to rotate the spacecraft at a specified spin rate by using a momentum vector.

3. The method of claim 2, wherein the spin controller commands the spacecraft to spin along any of three principle axes.

4. The method of claim 3, wherein the spin controller commands the spacecraft to spin along a major axis of the spacecraft by changing the sign of a controller gain.

5. The method of claim 3, wherein the spin controller commands the spacecraft to spin along a minor axis of the spacecraft by changing the sign of a controller gain.

6. The method of claim 2, wherein the spin controller uses an offset vector to specify the spacecraft spin axis direction and magnitude.

7. The method of claim 1, wherein the command provides a smooth closed-loop system response even when an actuator saturates.

8. The method of claim 1, wherein the spin controller commands the spacecraft to re-orient itself by changing a gain.

9. A system for controlling a spacecraft maneuver, the system comprising:
    a spacecraft having at least one solar wing, reaction wheels, and thrusters,
        wherein the at least one solar wing, the reaction wheels, and the thrusters are connected to the spacecraft; and
    a spin controller connected to the spacecraft,
        wherein the spin controller is configured for generating a command by using solar wing current as the only closed-loop feedback sensor, and
        wherein the spin controller is further configured for commanding, with the command, at least one of the momentum wheels and the thrusters to change the spacecraft spin axis and spin rate.

10. The system of claim 9, wherein the spin controller commands the spacecraft to align the spacecraft spin axis to an inertial fixed direction, and to rotate the spacecraft at a specified spin rate by using a momentum vector.

11. The system of claim 10, wherein the spin controller commands the spacecraft to spin along any of three principle axes.

12. The system of claim 11, wherein the spin controller commands the spacecraft to spin along a major axis of the spacecraft by changing the sign of a controller gain.

13. The system of claim 11, wherein the spin controller commands the spacecraft to spin along a minor axis of the spacecraft by changing the sign of a controller gain.

14. The system of claim 10, wherein the spin controller uses an offset vector to specify the spacecraft spin axis direction and magnitude.

15. The system of claim 9, wherein the command provides a smooth closed-loop system response even when an actuator saturates.

16. The system of claim 9, wherein the spin controller commands the spacecraft to re-orient itself by changing a gain.

* * * * *